US012574830B2

(12) United States Patent
Ryu et al.

(10) Patent No.: US 12,574,830 B2
(45) Date of Patent: Mar. 10, 2026

(54) SESSION MANAGEMENT FOR A NETWORK SLICE

(71) Applicant: Ofinno, LLC, Reston, VA (US)

(72) Inventors: Jinsook Ryu, Oakton, VA (US);
Esmael Hejazi Dinan, McLean, VA
(US); Peyman Talebi Fard, Vienna, VA
(US); Kyungmin Park, Vienna, VA
(US); Taehun Kim, Fairfax, VA (US);
Weihua Qiao, Herndon, VA (US)

(73) Assignee: Ofinno, LLC, Reston, VA (US)

( * ) Notice: Subject to any disclaimer, the term of this
patent is extended or adjusted under 35
U.S.C. 154(b) by 735 days.

(21) Appl. No.: 17/738,478

(22) Filed: May 6, 2022

(65) Prior Publication Data

US 2022/0264444 A1     Aug. 18, 2022

Related U.S. Application Data

(63) Continuation of application No.
PCT/US2020/059679, filed on Nov. 9, 2020.
(Continued)

(51) Int. Cl.
*H04W 48/18* (2009.01)
*H04W 48/02* (2009.01)
(Continued)

(52) U.S. Cl.
CPC ........... *H04W 48/18* (2013.01); *H04W 48/02*
(2013.01); *H04W 60/04* (2013.01); *H04W
60/06* (2013.01);
(Continued)

(58) Field of Classification Search
CPC ..... H04W 48/18; H04W 48/02; H04W 60/04;
H04W 60/06; H04W 60/00; H04W 76/10;
H04W 76/36; H04W 76/18
See application file for complete search history.

(56) References Cited

U.S. PATENT DOCUMENTS

| | | | |
|---|---|---|---|
| 2019/0254089 A1 | 8/2019 | Huang-Fu et al. | |
| 2022/0141700 A1* | 5/2022 | Hedman | H04W 28/0289 |
| | | | 370/230 |
| 2023/0091600 A1* | 3/2023 | Jeong | H04W 48/18 |
| | | | 455/435.2 |

FOREIGN PATENT DOCUMENTS

| | | |
|---|---|---|
| EP | 3544337 A1 | 9/2019 |
| WO | 2019/032968 A1 | 2/2019 |

(Continued)

OTHER PUBLICATIONS

3GPP TS 23.401 V16.4.0 (Sep. 2019); Technical Specification; 3rd
Generation Partnership Project; Technical Specification Group Ser-
vices and System Aspects; General Packet Radio Service (GPRS)
enhancements for Evolved Universal Terrestrial Radio Access Net-
work (E-UTRAN) access; (Release 16).

(Continued)

*Primary Examiner* — Omer S Mian

(74) *Attorney, Agent, or Firm* — Peter Flanagan; Kavon
Nasabzadeh; Jacob L. Mangan

(57) ABSTRACT

An access and mobility management function receives, from
a wireless device, a message requesting establishment of a
session for a slice. The access and mobility management
function determines that a maximum number of sessions for
the slice is reached. The access and mobility management
function sends, to the wireless device, based on the deter-
mining that the maximum number of sessions for the slice is
reached, a message rejecting the establishment of the session
for the slice.

20 Claims, 31 Drawing Sheets

Related U.S. Application Data

(60) Provisional application No. 62/932,379, filed on Nov. 7, 2019.

(51) Int. Cl.
  *H04W 60/04* (2009.01)
  *H04W 60/06* (2009.01)
  *H04W 76/10* (2018.01)
  *H04W 76/18* (2018.01)
  *H04W 60/00* (2009.01)

(52) U.S. Cl.
  CPC ........... *H04W 76/10* (2018.02); *H04W 76/18* (2018.02); *H04W 60/00* (2013.01)

(56) References Cited

FOREIGN PATENT DOCUMENTS

| | | | |
|---|---|---|---|
| WO | 2019/074347 A1 | 4/2019 | |
| WO | 2020/186145 A1 | 9/2020 | |
| WO | WO-2020250004 A1 * | 12/2020 | ............ H04W 48/02 |
| WO | 2021/006090 A1 | 1/2021 | |

OTHER PUBLICATIONS

3GPP Ts 23.501 V16.2.0 (Sep. 2019); Technical Specification; 3rd Generation Partnership Project; Technical Specification Group Services and System Aspects; System Architecture for the 5G System (5GS); Stage 2; (Release 16).

3GPP TS 23.502 V16.2.0 (Sep. 2019); Technical Specification; 3rd Generation Partnership Project; Technical Specification Group Services and System Aspects; Procedures for the 5G System (5GS); Stage 2; (Release 16).

3GPP TS 23.503 V16.2.0 (Sep. 2019); Technical Specification; 3rd Generation Partnership Project; Technical Specification Group Services and System Aspects; Policy and Charging Control Framework for the 5G System (5GS); Stage 2; (Release 16).

3GPP TS 24.301 V16.2.0 (Sep. 2019); Technical Specification; 3rd Generation Partnership Project; Technical Specification Group Core Network and Terminals; Non-Access-Stratum (NAS) protocol for Evolved Packet System (EPS); Stage 3; (Release 16).

3GPP TS 24.501 V16.2.0 (Sep. 2019); Technical Specification; 3rd Generation Partnership Project; Technical Specification Group Core Network and Terminals; Non-Access-Stratum (NAS) protocol for 5G System (5GS); Stage 3; (Release 16).

3GPP TS 38.300 V15.7.0 (Sep. 2019); Technical Specification; 3rd Generation Partnership Project; Technical Specification Group Radio Access Network; NR; NR and NG-RAN Overall Description; Stage 2; (Release 15).

3GPP TS 38.331 V15.7.0 (Sep. 2019); Technical Specification; 3rd Generation Partnership Project; Technical Specification Group Radio Access Network; NR; Radio Resource Control (RRC) protocol specification; (Release 15).

C1-182764; 3GPP TSG-CT WG1 Meeting #110; Kunming (China), Apr. 16-Apr. 20, 2018; Source: Huawei, HiSilicon; Title: Handling of Max number of PDU sessions; Spec: 3GPP TS 24.501 V1.0.0; Agenda item: 15.2.2.4; Document for: Agreement.

3GPP TR 23.700-40 V0.1.0 (Oct. 2019); Technical Report; 3rd Generation Partnership Project; Technical Specification Group Services and System Aspects; Study on Enhancement of Network Slicing Phrase 2; (Release 17).

S2-1908651; (revision of S2-1907776); SA WG2 Meeting #S2-135; Oct. 14-18, 2019, Split Croatia; S2-1907776; SA WG2 Meeting S2#134; Jun. 24-28, 2019, Sapporo, Japan; Liaison Statement; Liaison Statement Title: NG.116 GST publication and cooperation with 3GPP SA2.

S2-1908913; SA WG2 Meeting #135; Oct. 14-18, 2019, Split, HR; Source: vivo; Title: Key issue for slice capacity management; Document for: Discussion/Approval; Agenda Item: 8.8; Work Item / Release: FS_eNS_Ph2/Rel-17.

S2-1909175; SA WG2 Meeting #135; Oct. 14-18, 2019, Split, Croatia; Source: Samsung; Title: A new key issue: Per slice connection management; Document for: Approval; Agenda Item: 8.8; Work Item / Release: FS_eNS_ph2 / Rel-17.

S2-1909260; SA WG2 Meeting #135; Oct. 14-18, 2019, Split, Croatia; Source: Nokia, Nokia Shanghai Bell, Telecom Italia; Title: KI on limitation of number of connections per Network Slice; Document for: Discussion and Agreement; Agenda Item: 8.8; Work Item / Release: FS_eNS_Ph2/Rel-17.

S2-1910524; (revision of S2-1909218); SA WG2 Meeting #135; Oct. 14-18, 2019, Split, HR; Source: NTT Docomo, Nokia, Nokia Shanghai Bell, Telecom Italia, NEC, Sprint, Ericsson, Samsung; Title: New Key Issue on "support for network slice quota enforcement in a network slice"; Document for: Approval; Agenda Item: 8.8; Work Item / Release: FS_eNS_ph2 / Rel-17.

S2-1910684; 3GPP TSG-SA WG2 Meeting #135; Split, Croatia, Oct. 14-18, 2019; Title: Draft Reply LS on NG.116 GST publication and cooperation with 3GPP SA2; Reply to: S2-1908651; Release: Rel-17; Work Item: FS_eNS_Ph2.

S2-1910748; (revision of S2-191052208961); SA WG2 Meeting #135; Split, Croatia, Oct. 14-18, 2019; Source: Huawei, HiSilicon; Title: New Key Issue for 5GS Enhancements for supporting GST attributes; Document for: Approval; Agenda Item: 8.8; Work Item / Release: FS_eNS_Ph2 / Rel-17.

S2-1910749; (revision of S2-1910524); SA WG2 Meeting #135; Oct. 14-18, 2019, Split, HR; Source: NTT Docomo, Nokia, Nokia Shanghai Bell, Telecom Italia, NEC, Sprint, Ericsson, Samsung, ZTE; Title: New Key Issue on "support for network slice quota enforcement in a network slice"; Document for: Approval; Agenda Item: 8.8; Work Item / Release: FS_eNS_ph2 / Rel-17.

S2-1910751; (was S2-1910523, S2-1909247); SA WG2 Meeting #135; Oct. 14-18, 2019, Split, Croatia; Source: Samsung, ZTE ; Title: Architectural AssumptionsKey Issue on granularity of network slices; Document for: Approval; Agenda Item: 8.8; Work Item / Release: FS_eNS_Ph2 / Rel-17.

SP-190931; 3GPP TSG SA Meeting #85; Sep. 17-20, 2019, Newport Beach, USA; Source: SA WG2; Title: New SID: Feasibility on Multimedia Priority Service (MPS) Phase 2, Stage 2; Document for: Approval; Agenda Item: 6.2; Work Item: {FS_eNS_Ph2}.

GSM Association; Official Document NG. 116—Generic Network Slice Template; Generic Network Slice Template Version 1.0; May 23, 2019.

S2-1909760; 3GPP SA#135; Split, Croatia—Oct. 14-18, 2019; Roaming Support Considerations for Slice-based GST Parameters Support; Source: ZTE (Rapporteur); Document for: Discussion and Action; Agenda Item: 8.8; Work Item / Release: FS_eNS_Ph2 / Rel-17.

International Search Report and Written Opinion of the International Searching authority mailed Apr. 12, 2021, in International Application No. PCT/US2020/059679.

* cited by examiner

RM State Transition in UE

RM State Transition in AMF

CM State Transition in UE

CM State Transition in AMF

RRC State Transition

Call flow for RRC state transition

Control plane protocol stack between a wireless device and a SMF

| Information element | Type/reference | Presence |
|---|---|---|
| UL NAS TRANSPORT Message identity | Message type | M |
| Payload container type | Payload container type | M |
| Payload container | Payload container | M |
| PDU session ID | PDU session identity 2 | C |
| Old PDU session ID | PDU session identity 2 | O |
| Request type | Request type | O |
| S-NSSAI | S-NSSAI | O |
| DNN | DNN | O |
| Additional information | Additional information | O |

Uplink NAS transport message content

FIG. 17

| Information element | Type/reference | Presence |
|---|---|---|
| DL NAS TRANSPORT message identity | Message type | M |
| Payload container type | Payload container type | M |
| Payload container | Payload container | M |
| PDU session ID | PDU session identity 2 | C |
| 5GMM cause | 5GMM cause | O |
| Back-off timer value | GPR timer 3 | O |

Downlink NAS transport message content

FIG. 18

| Cause value | | | | | | | | Description |
|---|---|---|---|---|---|---|---|---|
| 8 | 7 | 6 | 5 | 4 | 3 | 2 | 1 | |
| 0 | 0 | 0 | ... | 0 | 0 | 1 | 1 | Illegal UE |
| 0 | 1 | 0 | ... | 0 | 0 | 0 | 1 | Maximum number of PDU sessions reached |
| 0 | 1 | 0 | ... | 0 | 0 | 1 | 1 | Insufficient resources for specific slice and DNN |
| 0 | 1 | 0 | ... | 0 | 1 | 0 | 1 | Insufficient resources for specific slice |
| 0 | 1 | 0 | ... | 0 | 1 | 1 | 0 | Maximum number of PDU sessions for specific slice reached |
| 0 | 1 | 0 | ... | 0 | 1 | 1 | 1 | Maximum number of PDU sessions & Maximum number of PDU sessions for a specific slice reached |
| | | | ... | | | | | |

Mobility management cause (5GMM cause)

FIG. 23

| 8 | 7 | 6 | 5 | 4 | 3 | 2 | 1 |
|---|---|---|---|---|---|---|---|
| PSAC | PSAC | PSAC | PSAC | PSAC | PSAC | PSAC | PSAC |
| Operator-defined access category definitions IEI ||||||||
| Length ||||||||
| Operator-defined access category definition 1 ||||||||
| Operator-defined access category definition 2 ||||||||
| .... ||||||||

Operator-define access category definition information element (IE)

FIG. 26A

| 8 | 7 | 6 | 5 | 4 | 3 | 2 | 1 |
|---|---|---|---|---|---|---|---|
| Length of operator-defined access category definition contents ||||||||
| Precedence value ||||||||
| PSAC | 0 Spare | 0 Spare | Operator-defined access category number |||||
| Length of criteria ||||||||
| Criteria ||||||||
| 0 Spare | 0 Spare | 0 Spare | Standardized access categoty |||||

FIG. 26B

Operator-defined access category number

| 5 | 4 | 3 | 2 | 1 | |
|---|---|---|---|---|---|
| 0 | 0 | 0 | 0 | 0 | Access category number 32 |
| | | to | | | |
| 1 | 1 | 1 | 1 | 1 | Access category number 63 |

FIG. 27A

Criteria type

| 5 | 4 | 3 | 2 | 1 | |
|---|---|---|---|---|---|
| 0 | 0 | 0 | 0 | 0 | DNN type |
| 0 | 0 | 0 | 0 | 1 | OS id + OS App id type |
| 0 | 0 | 0 | 1 | 0 | S-NSSAI type |
| 0 | 0 | 0 | 1 | 1 | S-NSSAI type and allowed number of PDU sessions |

All other values area reserved

Figure 30:
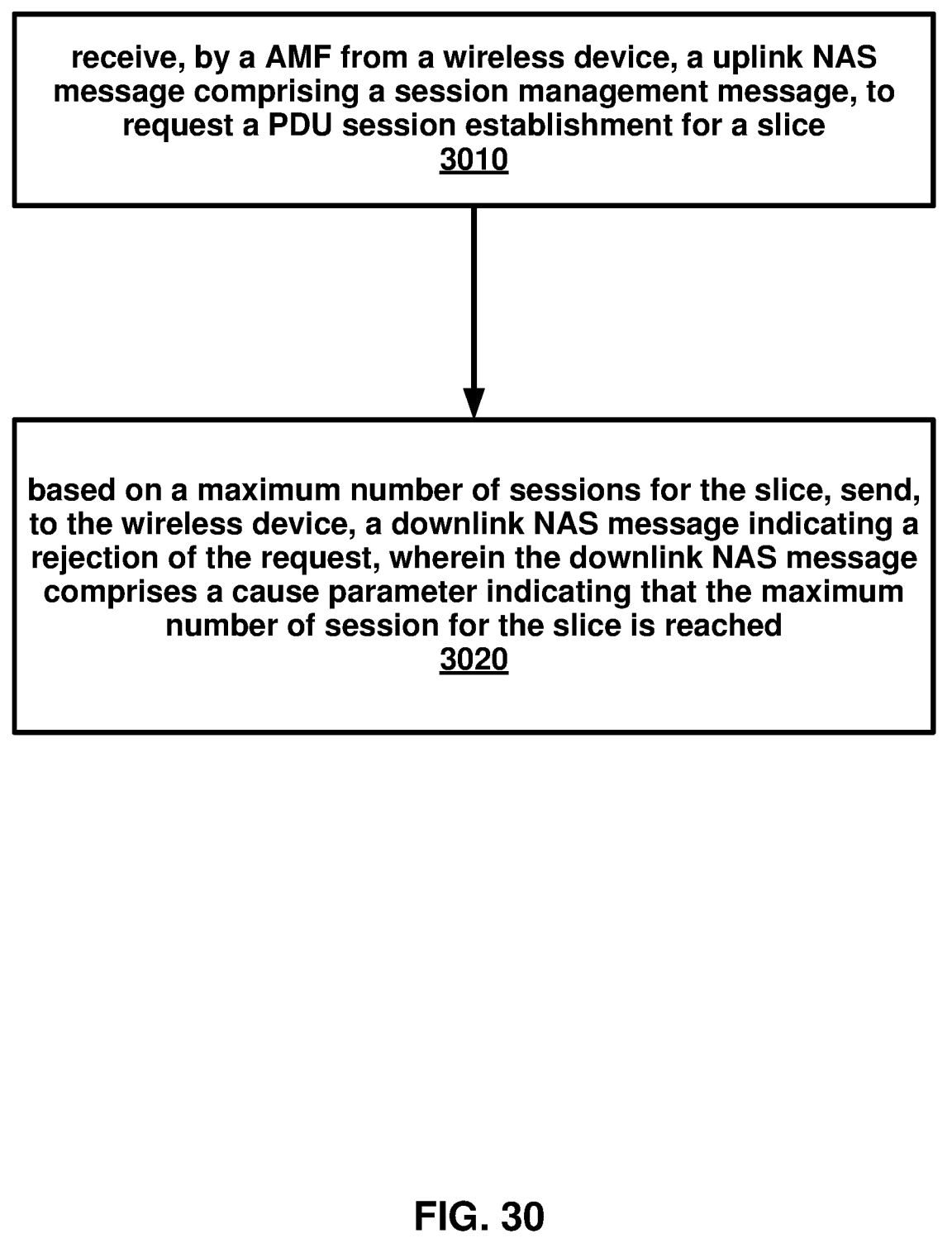

FIG. 27B receive, by a AMF from a wireless device, a uplink NAS message comprising a session management message, to request a PDU session establishment for a slice
3010 based on a maximum number of sessions for the slice, send, to the wireless device, a downlink NAS message indicating a rejection of the request, wherein the downlink NAS message comprises a cause parameter indicating that the maximum number of session for the slice is reached
3020

FIG. 30 send, by a wireless device to an AMF, a uplink NAS message comprising a session management message to request a PDU session establishment for a slice
3110 receive, by the wireless device from the AMF, a downlink NAS message indicating a rejection of the request, the downlink NAS message comprises:

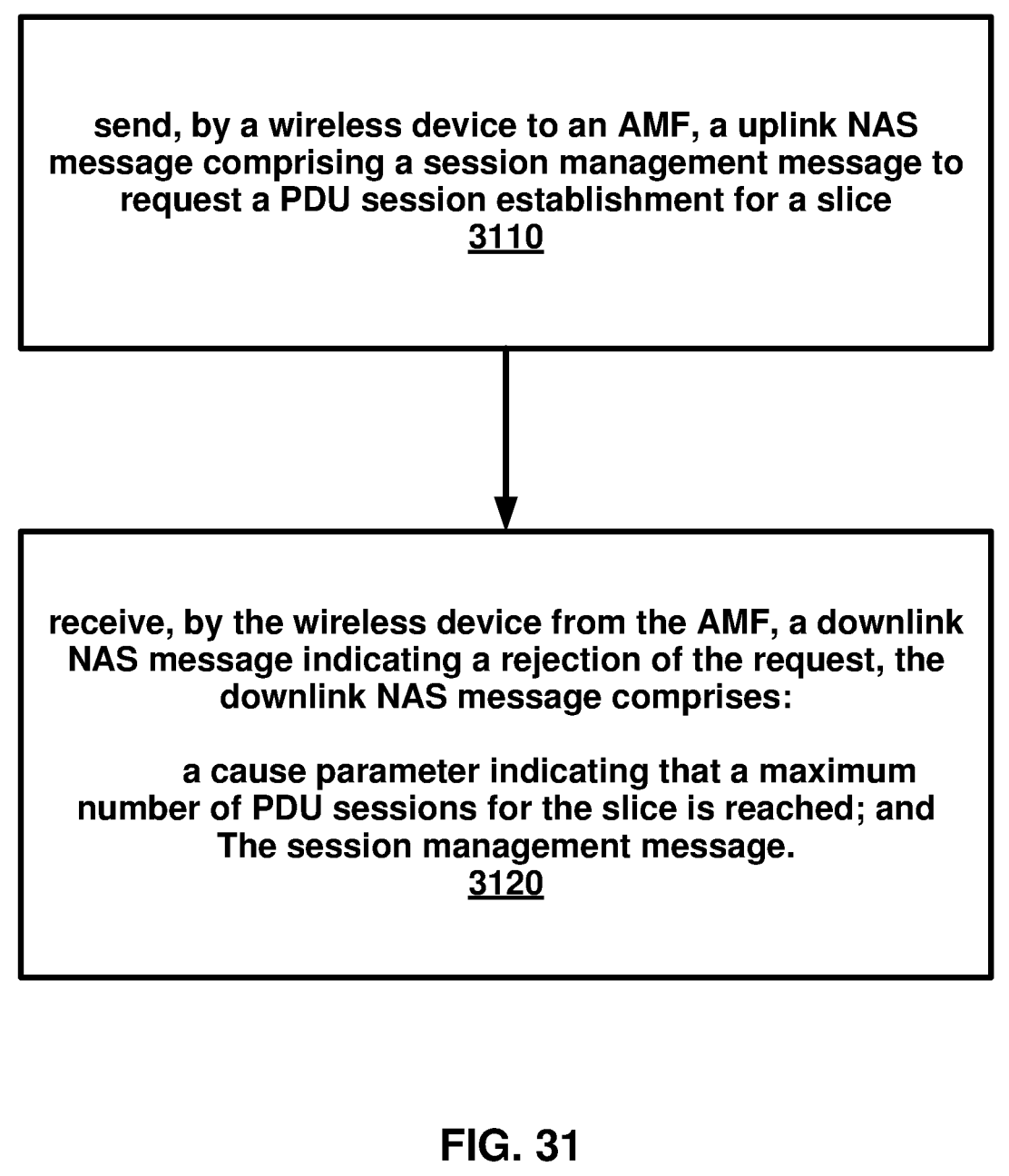

a cause parameter indicating that a maximum number of PDU sessions for the slice is reached; and The session management message.
3120

FIG. 31

SESSION MANAGEMENT FOR A NETWORK SLICE

CROSS-REFERENCE TO RELATED APPLICATIONS

This application is a continuation of International Application No. PCT/US2020/059679, filed Nov. 9, 2020, which claims the benefit of U.S. Provisional Application No. 62/932,379, filed Nov. 7, 2019, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 17 illustrates an aspect of an example embodiment of a present disclosure.

FIG. 18 illustrates an aspect of an example embodiment of a present disclosure.

FIG. 23 illustrates an aspect of an example embodiment of a present disclosure.

FIGS. 26A and 26B illustrate an aspect of an example embodiment of a present disclosure.

FIGS. 27A and 27B illustrate an aspect of an example embodiment of a present disclosure.

FIG. 30 is a flow chart of an aspect of an example embodiment of a present disclosure.

FIG. 31 is a flow chart of an aspect of an example embodiment of a present disclosure.

DETAILED DESCRIPTION OF EXAMPLES

Example embodiments of the present invention enable implementation of enhanced features and functionalities in 4G/5G systems. Embodiments of the technology disclosed herein may be employed in the technical field of 4G/5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
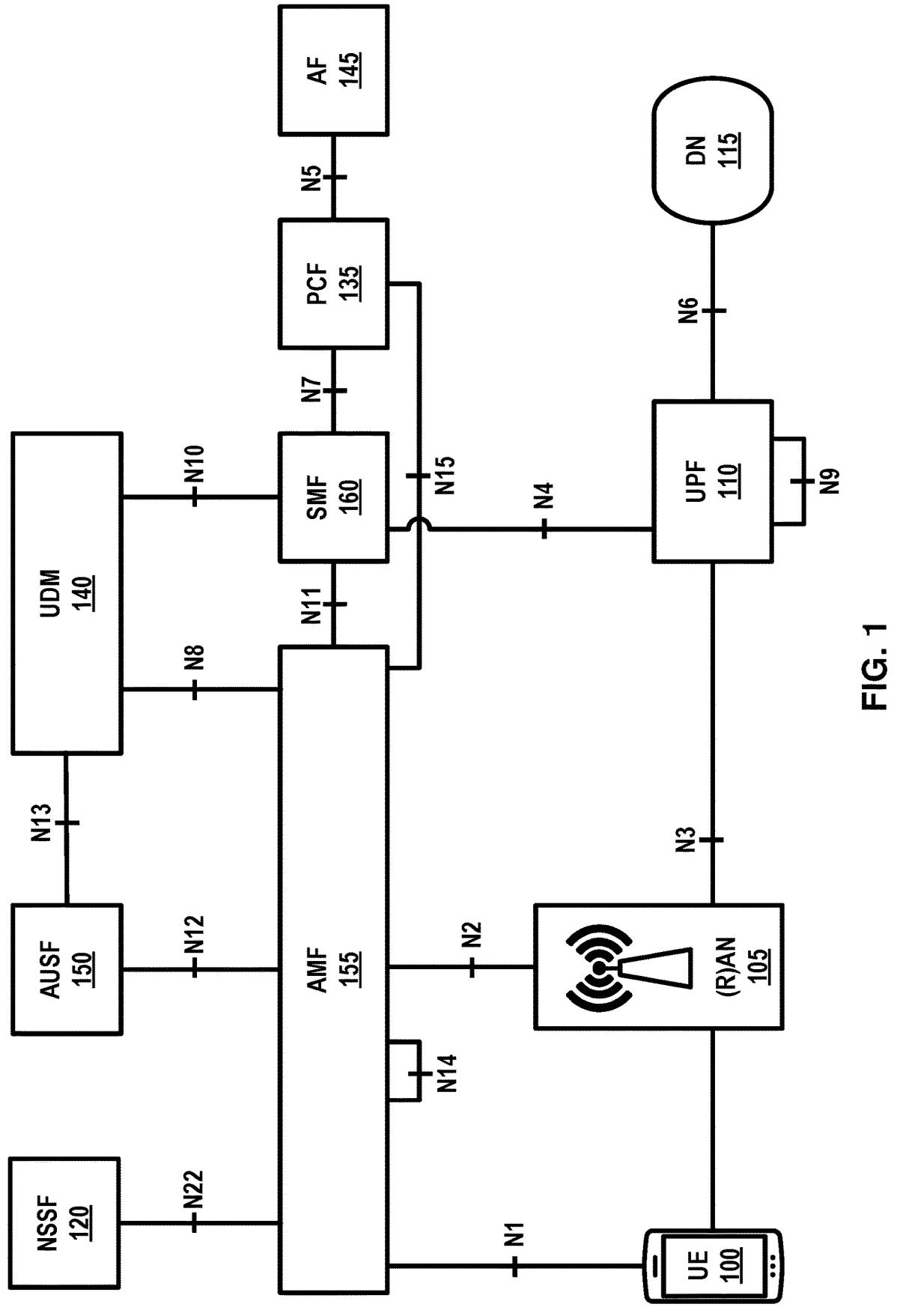
FIG. 1 is a diagram of an example 5G system architecture as per an aspect of an embodiment of the present disclosure.
Figure 2:
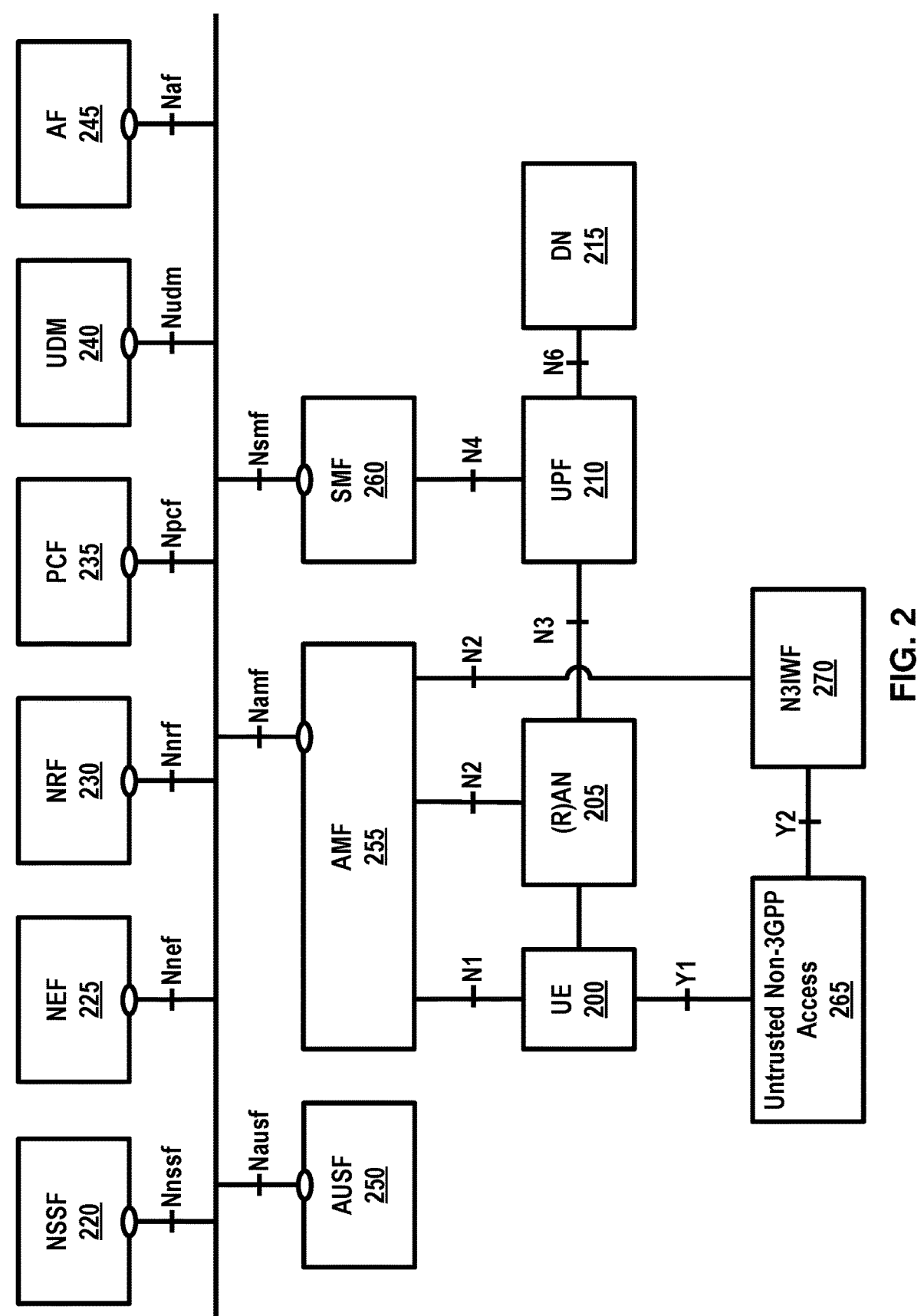
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
ACK Acknowledgement
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
DRX Discontinuous Reception
F-TEID Fully Qualified TEID
gNB next generation Node B
GPSI Generic Public Subscription Identifier
GTP GPRS Tunneling Protocol
GUTI Globally Unique Temporary Identifier
HPLMN Home Public Land Mobile Network
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier NAS Non-Access Stratum
NAS-MM Non-Access Stratum mobility management
NAS-SM Non-Access Stratum session management
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
PRACH Physical Random Access CHannel
PLMN Public Land Mobile Network
RAN Radio Access Network
QFI QoS Flow Identity
RM Registration Management
S1-AP S1 Application Protocol
SBA Service Based Architecture
SEA Security Anchor Function
SCM Security Context Management
SI System Information
SIB System Information Block
SMF Session Management Function
SMSF SMS Function
S-NSSAI Single Network Slice Selection Assistance
    information
SUCI Served User Correlation ID
SUPI Subscriber Permanent Identifier
TEID Tunnel Endpoint Identifier
UE User Equipment
UL Uplink
UL CL Uplink Classifier
UPF User Plane Function
VPLMN Visited Public Land Mobile Network Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
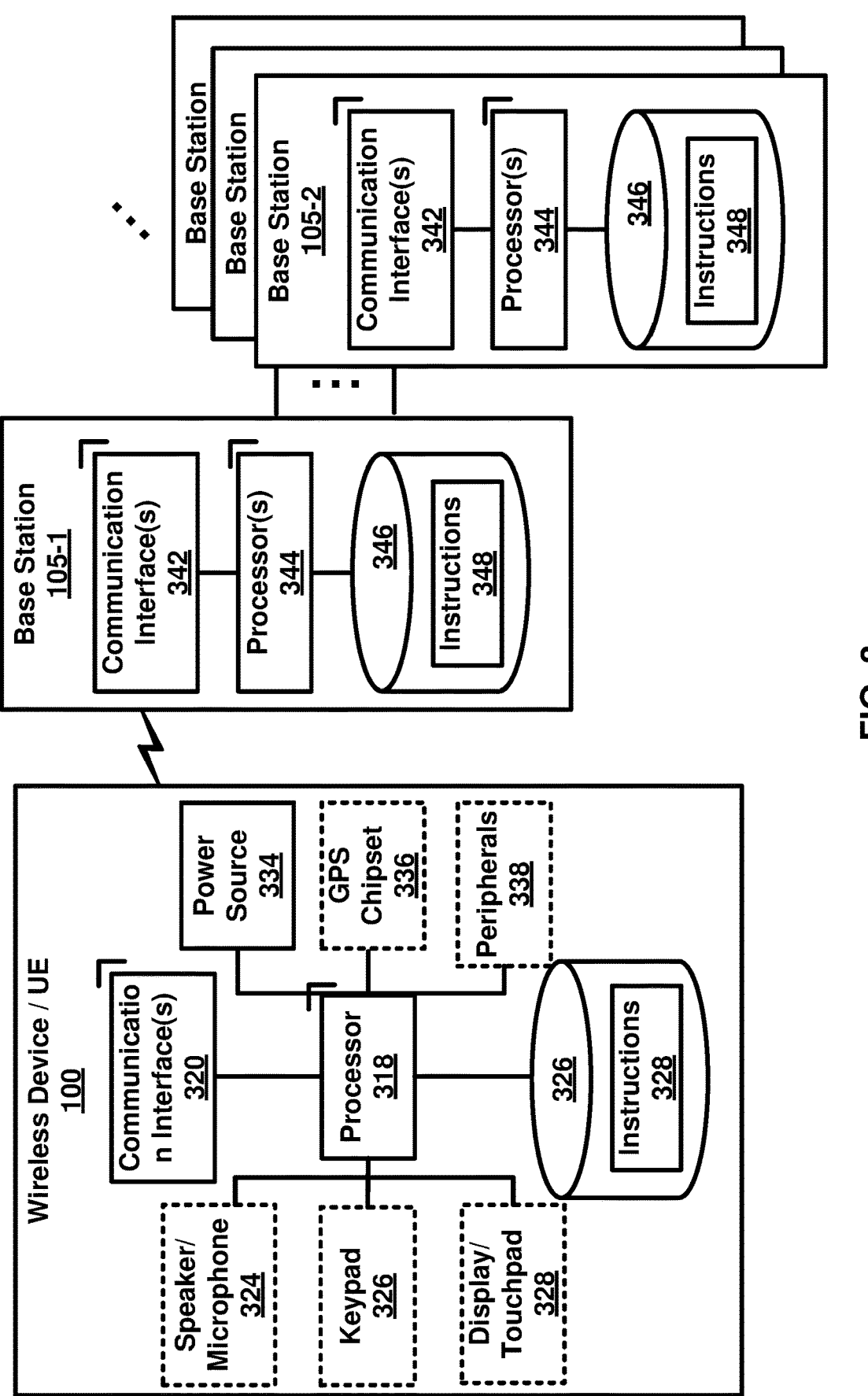
FIG. 3 is a system diagram of an example wireless device and a network node in a 5G system as per an aspect of an embodiment of the present disclosure.
Figure 4:
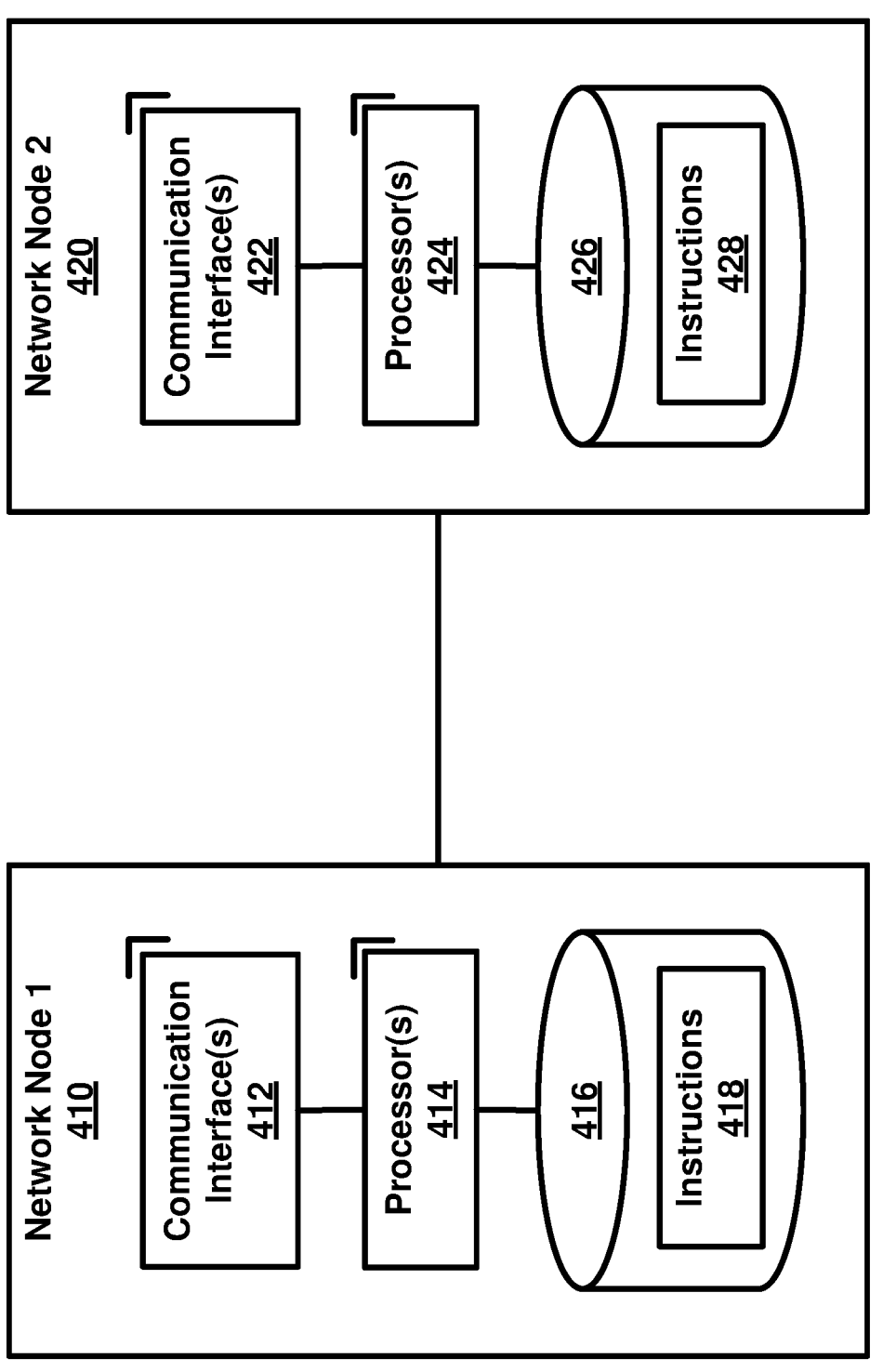
FIG. 4 is a system diagram of an example wireless device as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function (AF), AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figures 5A, 5B:
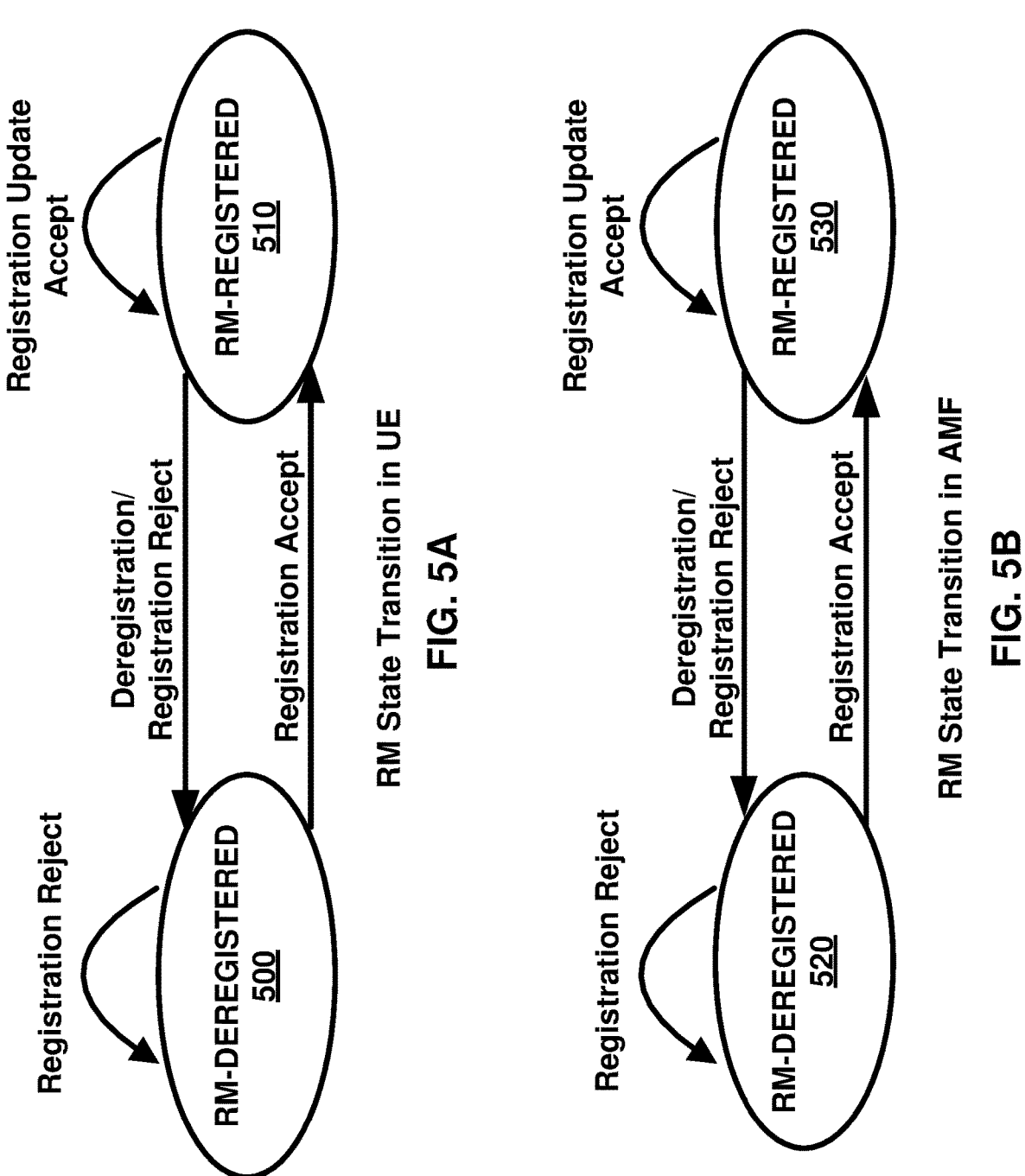
FIG. 5A and FIG. 5B depict two registration management state models in UE 100 and AMF 155 as per an aspect of embodiments of the present disclosure.

In an example, as depicted in example FIG. 5A and FIG. 5B, the registration management, RM may be employed to register or de-register a UE/user 100 with the network and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
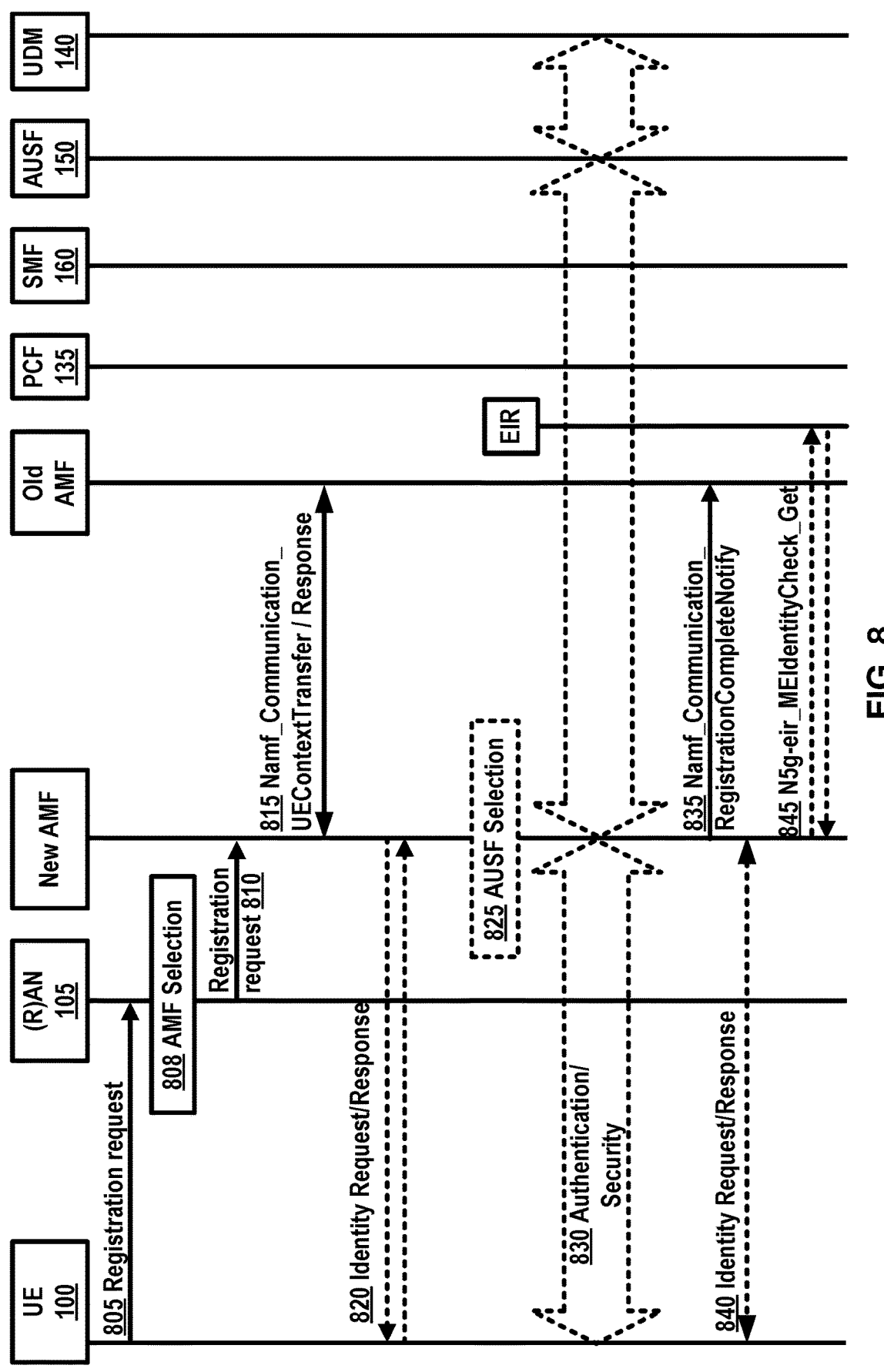
FIG. 8 is an example call flow as per an aspect of an embodiment of the present disclosure.
Figure 9:
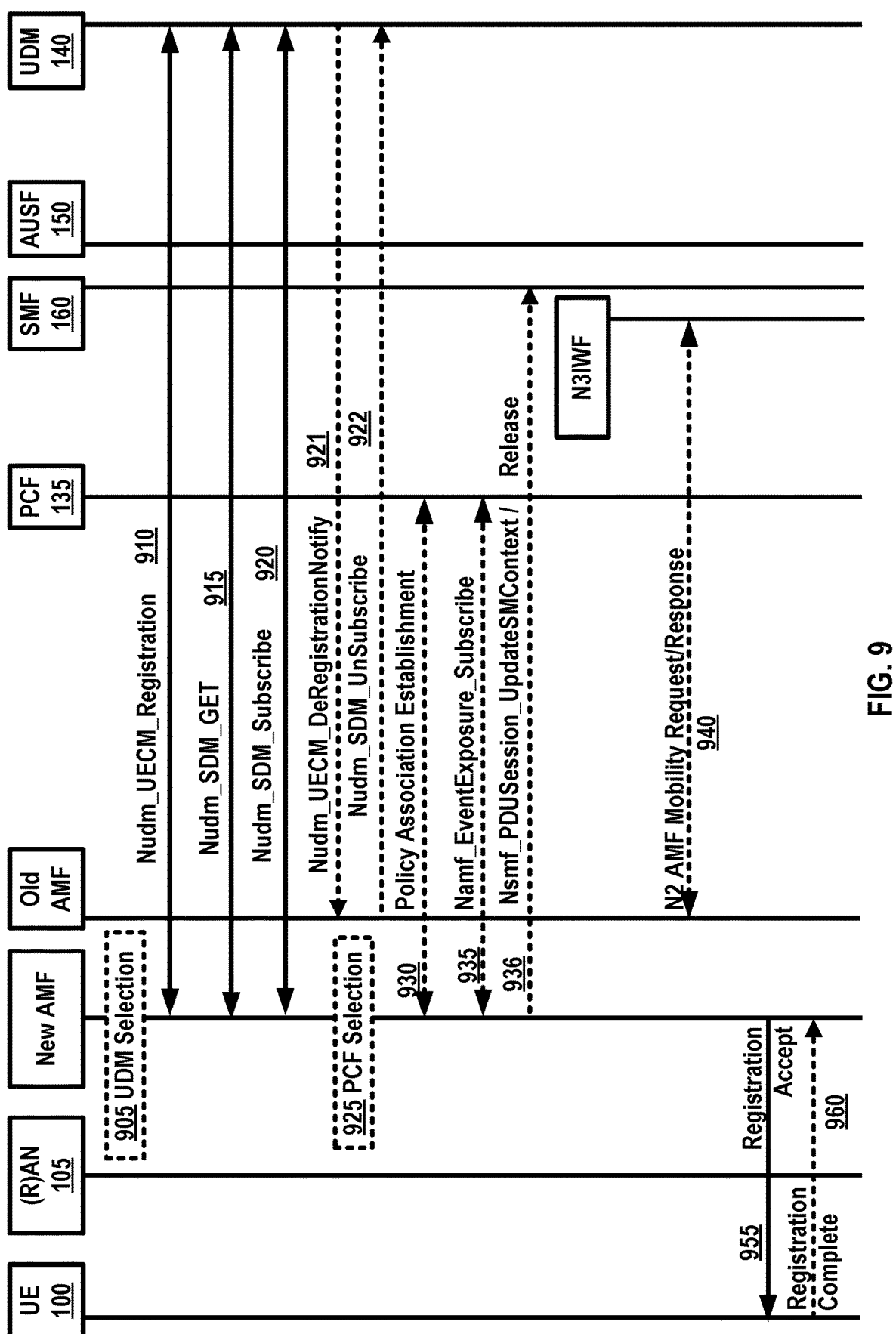
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

Figures 6A, 6B:
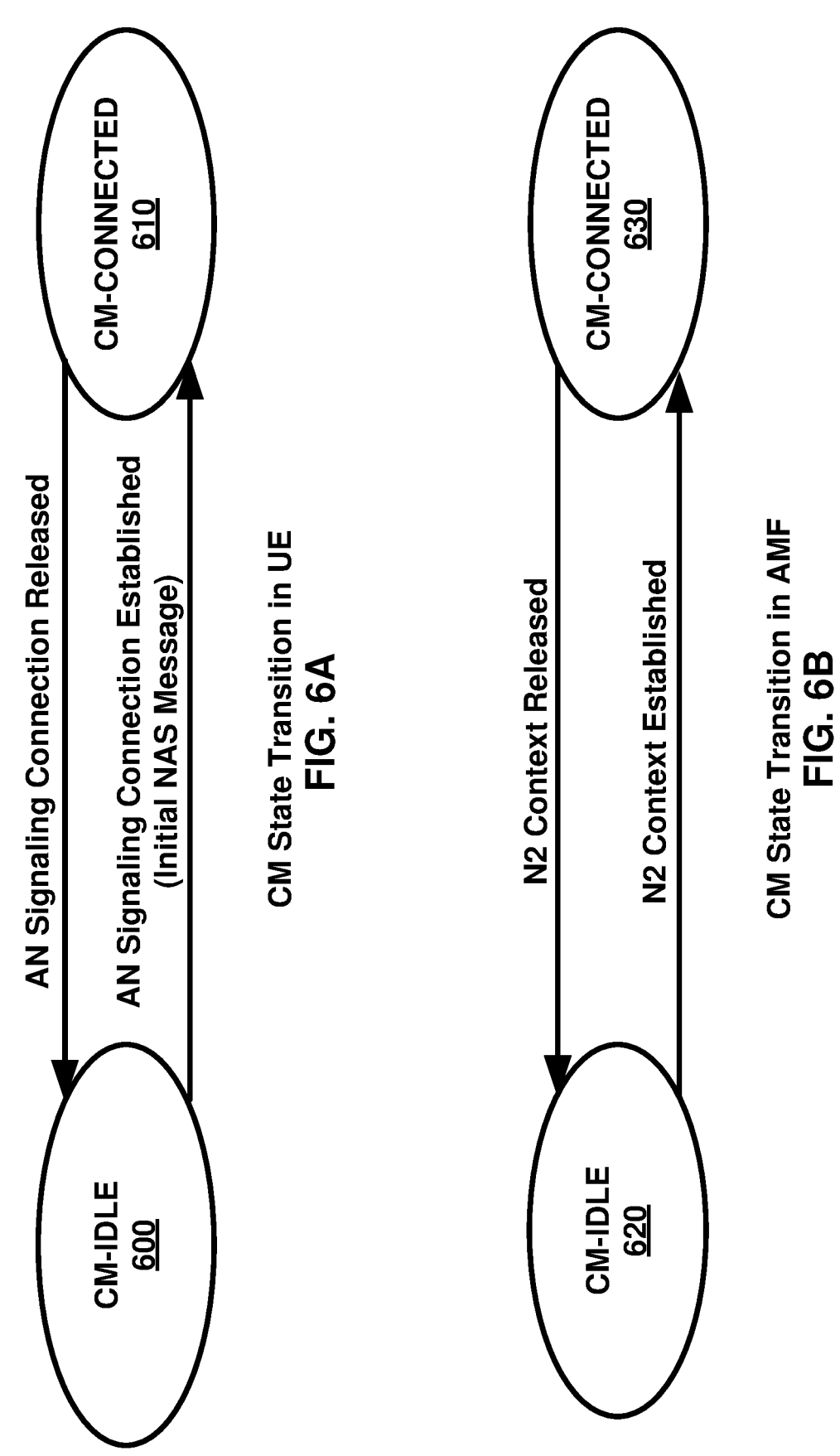
FIG. 6A and FIG. 6B depict two connection management state models in UE 100 and AMF 155 as per an aspect of embodiments of the present disclosure.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155. In an example, the signaling connection may be a N1 signaling connection. In an example, the signaling connection may be a N1 NAS signaling connection.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 in CM-IDLE 600 state may be in RRC idle state. The UE 100 may perform cell selection, cell reselection, PLMN selection, and/or the like. A UE 100 in CM-CONNECTED 610 state may have a NAS signaling connection with the AMF 155 over N1. In an example, the UE 100 in CM-CONNECTED 610 state may be an RRC connected state. The UE 100 in CM-CONNECTED 610 state may be an RRC inactive state. In an example, a CM state in an AMF and a CM state in a UE may be different. This may be a case when a local state change happens without explicit signaling procedure (e.g., UE context release procedure) between the UE and the AMF. In an example, an RRC state in a UE (e.g., wireless device) and an RRC state in a base station (e.g., gNB, eNB) may be different. This may be a case when a local state change happens without explicit signaling procedure (e.g., RRC release procedure) between the UE and the base station.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
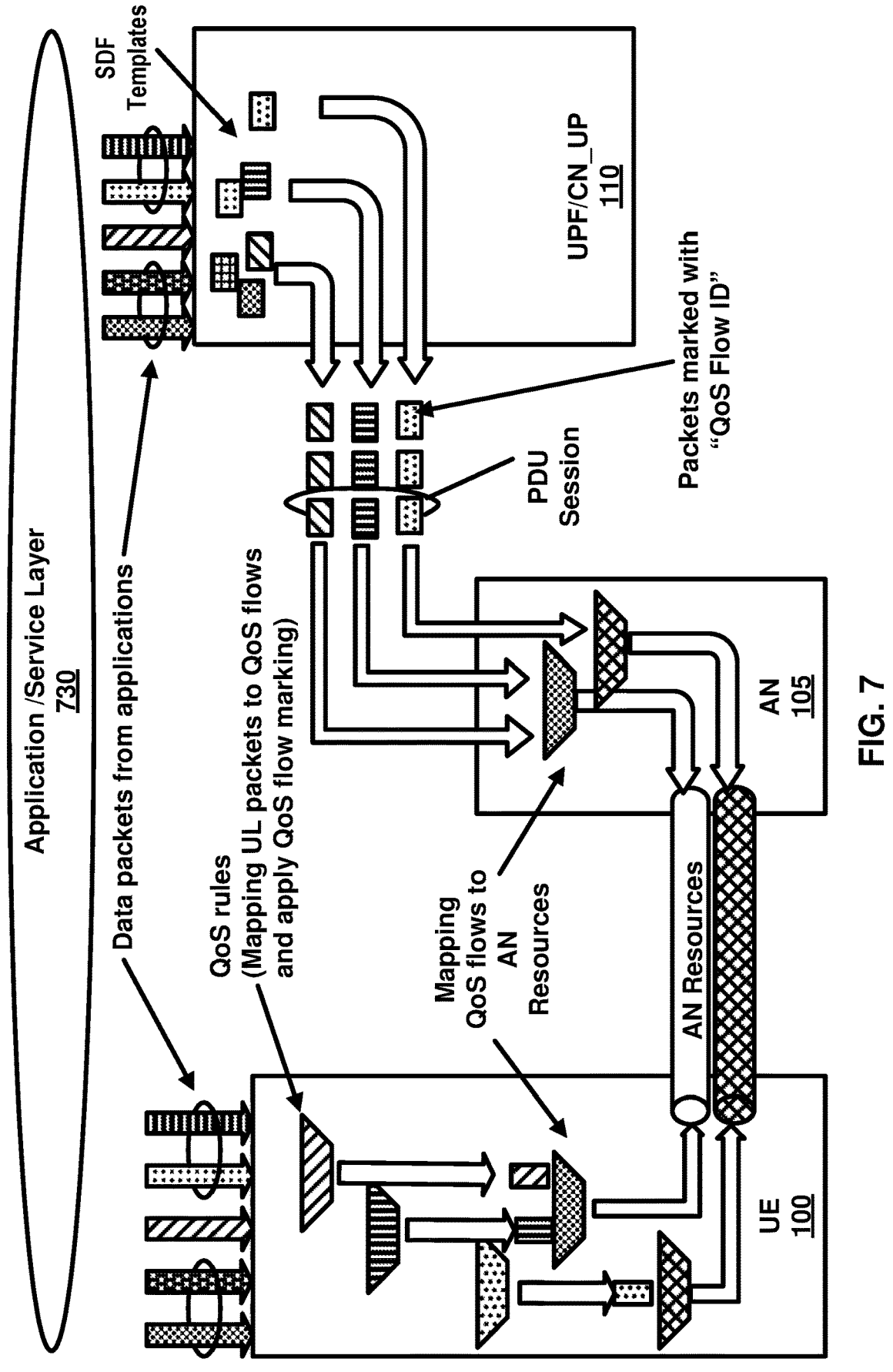
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF

155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (e.g. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (e.g., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (e.g. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 a Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentity-Check_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AM-PolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 an Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
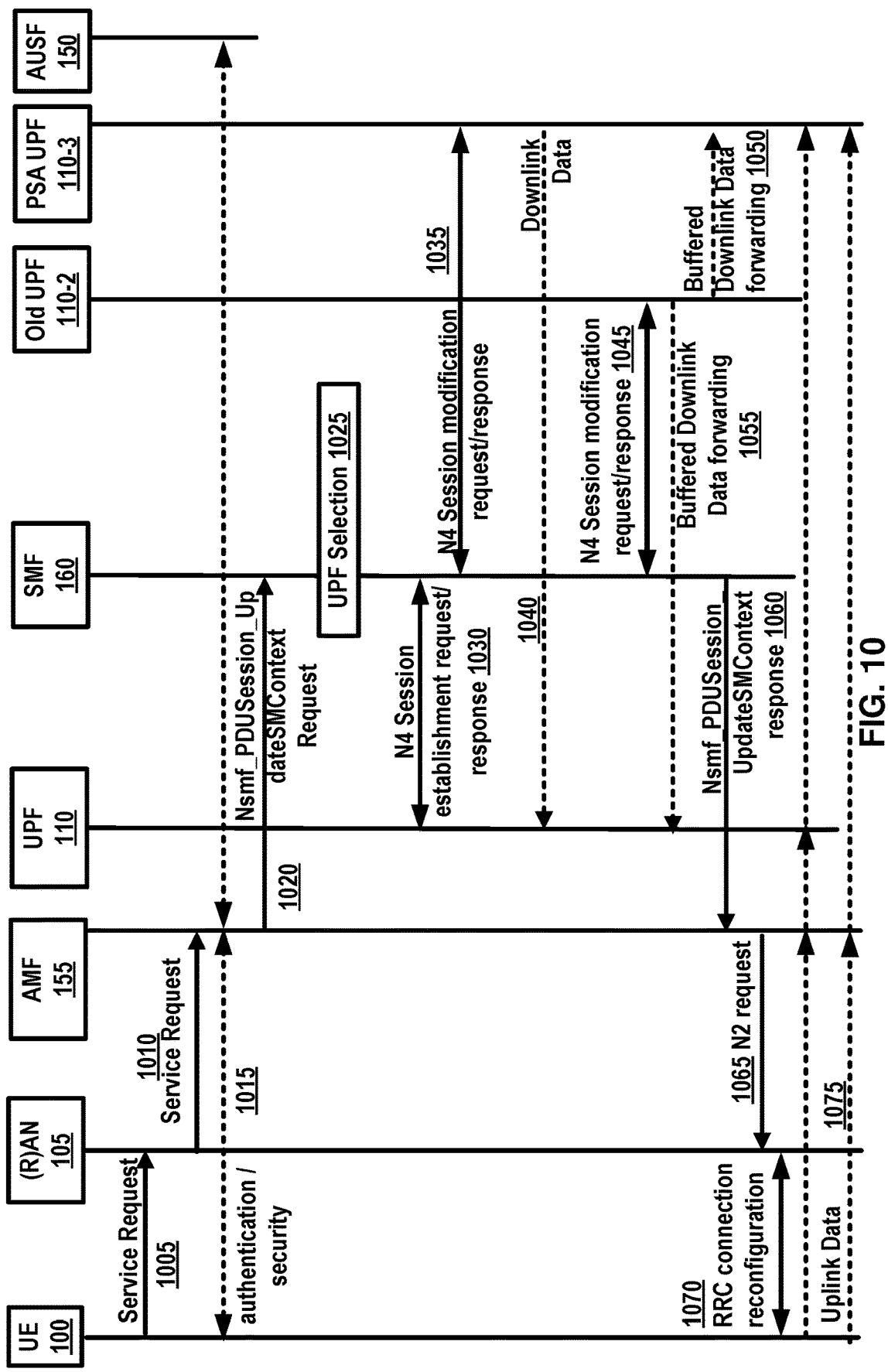
FIG. 10 is an example call flow as per an aspect of an embodiment of the present disclosure.
Figure 11:
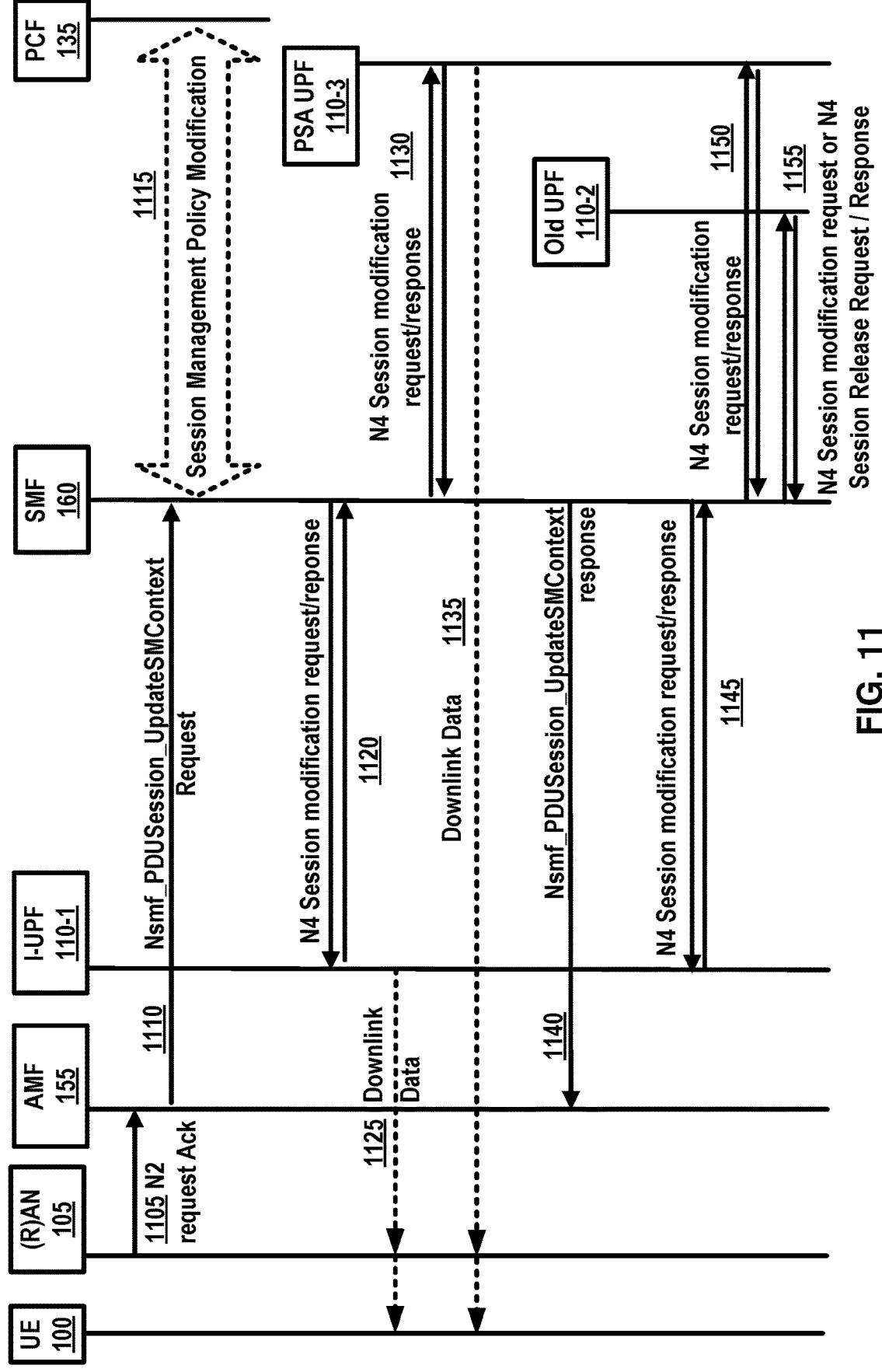
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send a Nsmf_PDUSession_UpdateSMContext request to SMF 160(s) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (e.g. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send a Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSM-Context response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSM-Context response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, a Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
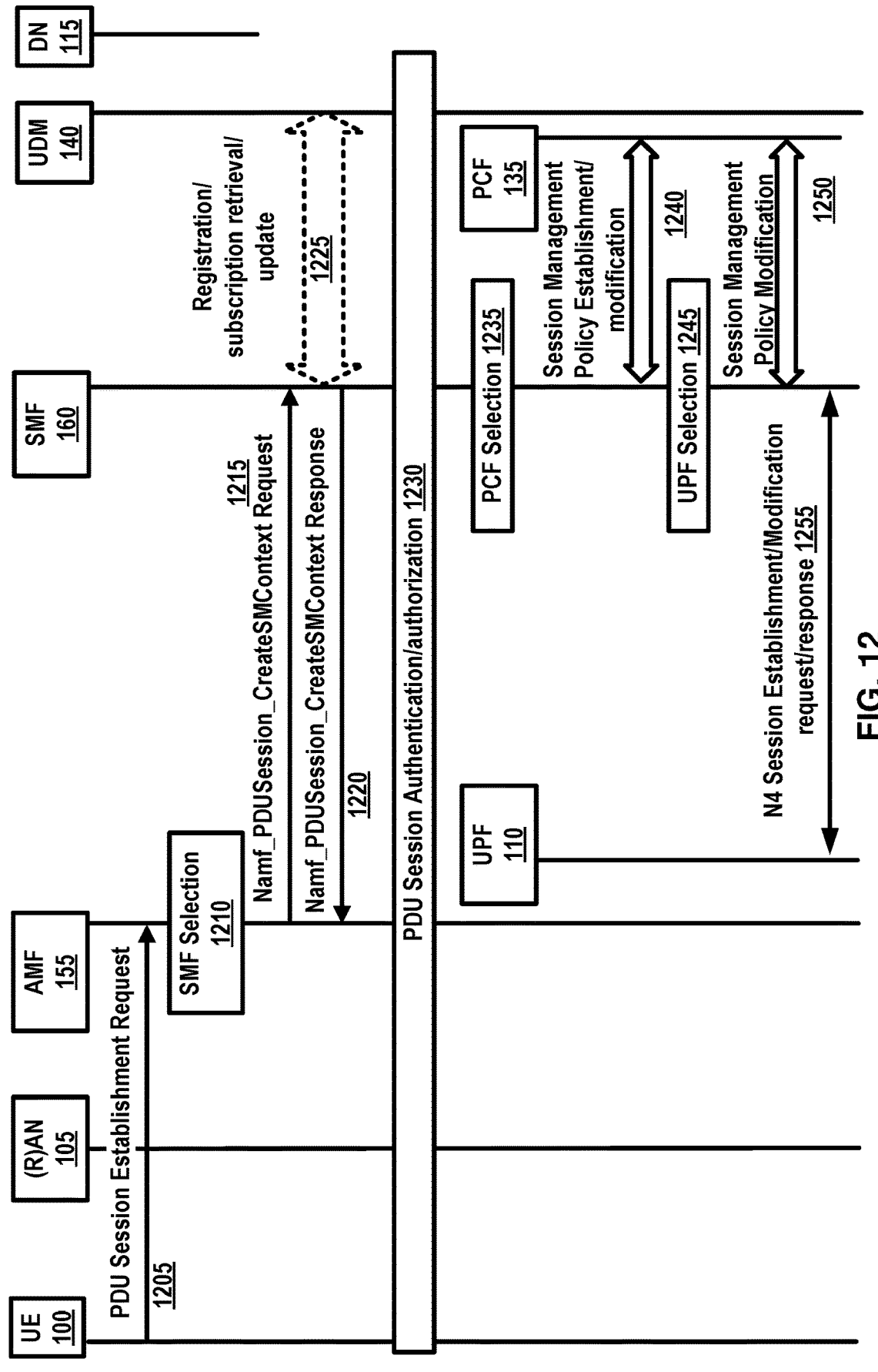
FIG. 12 is an example call flow as per an aspect of an embodiment of the present disclosure.
Figure 13:
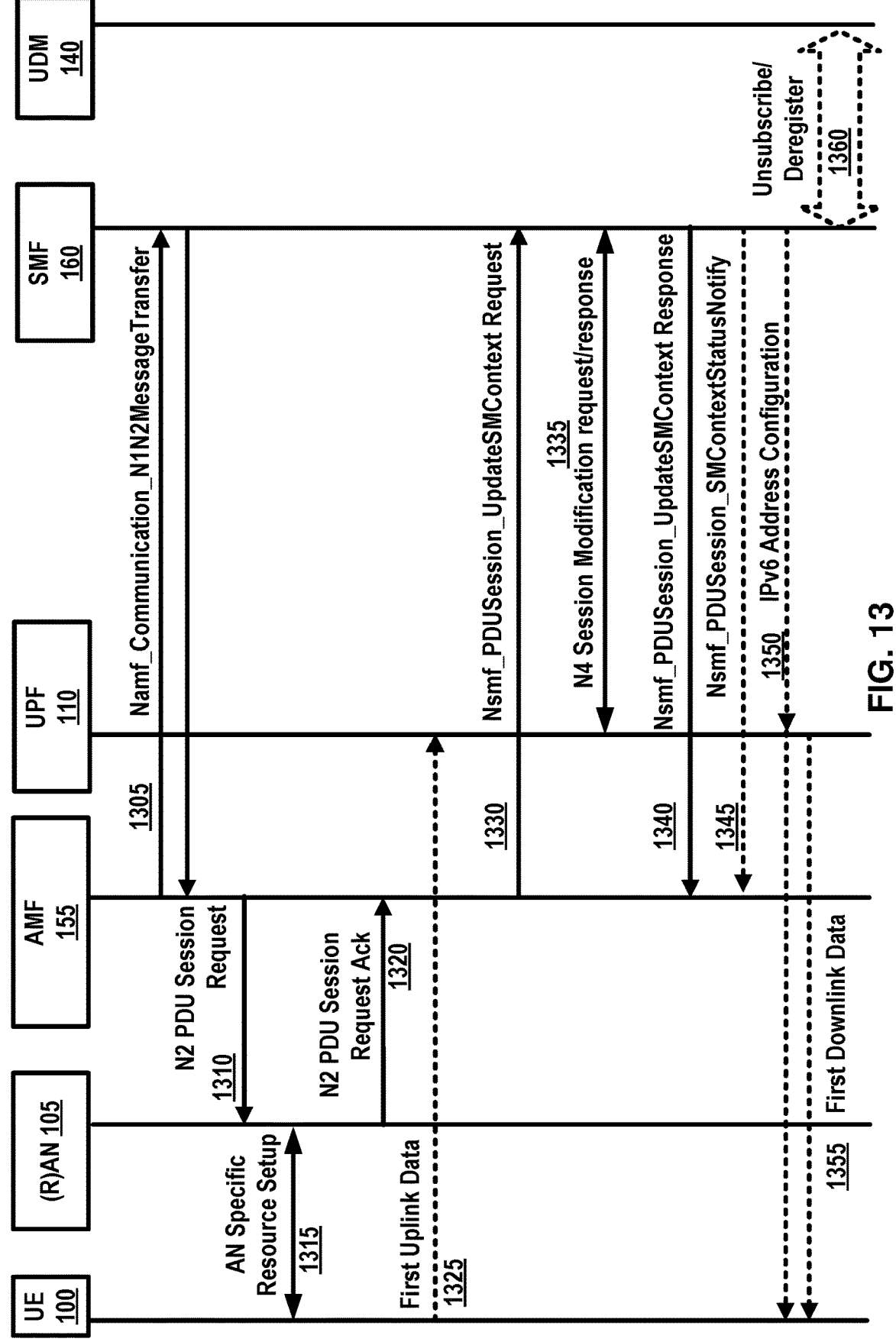
FIG. 13 is an example call flow as per an aspect of an embodiment of the present disclosure.
Figure 14:
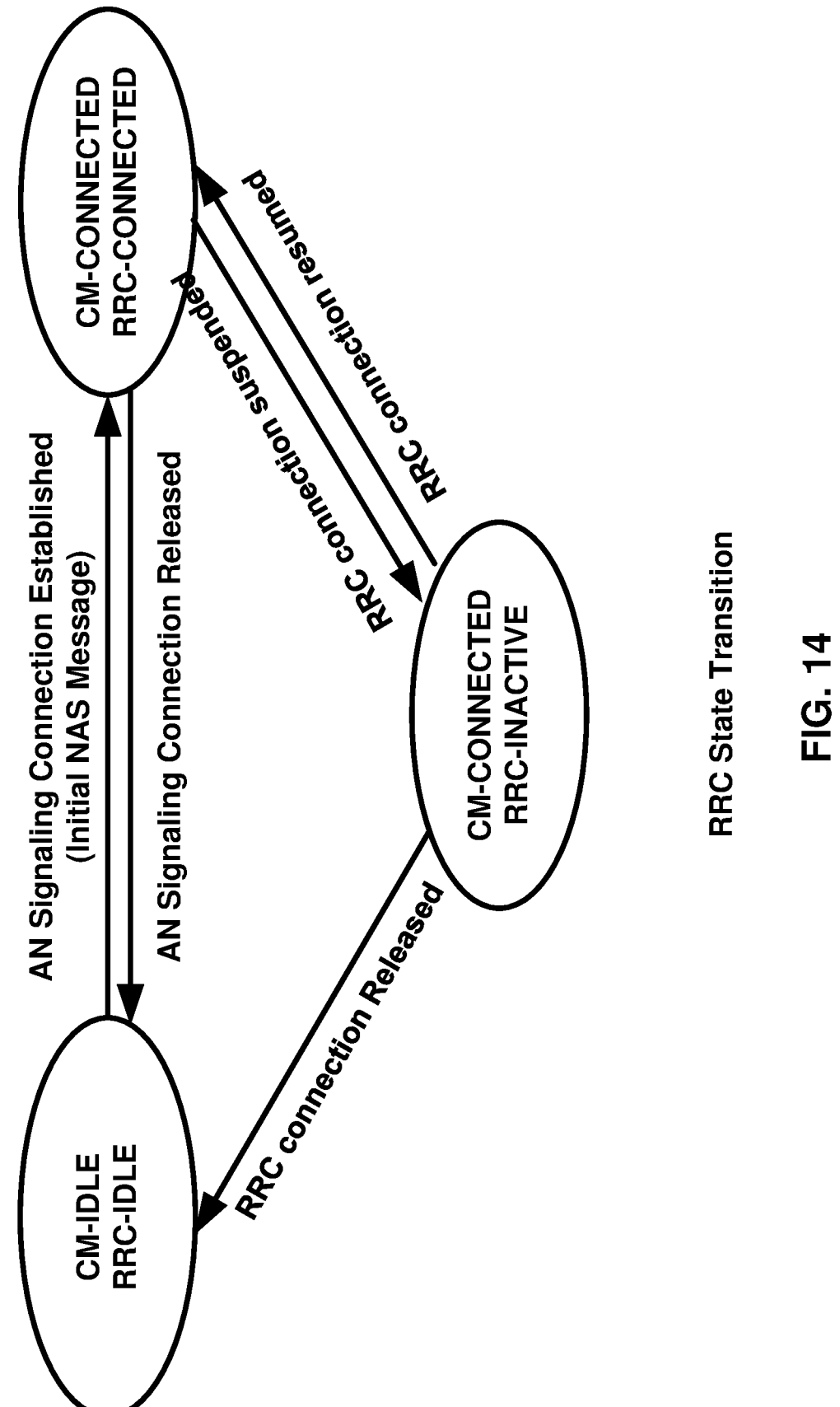
FIG. 14 is an example radio resource control (RRC) state transition aspect as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or a Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_

EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify (release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 15:
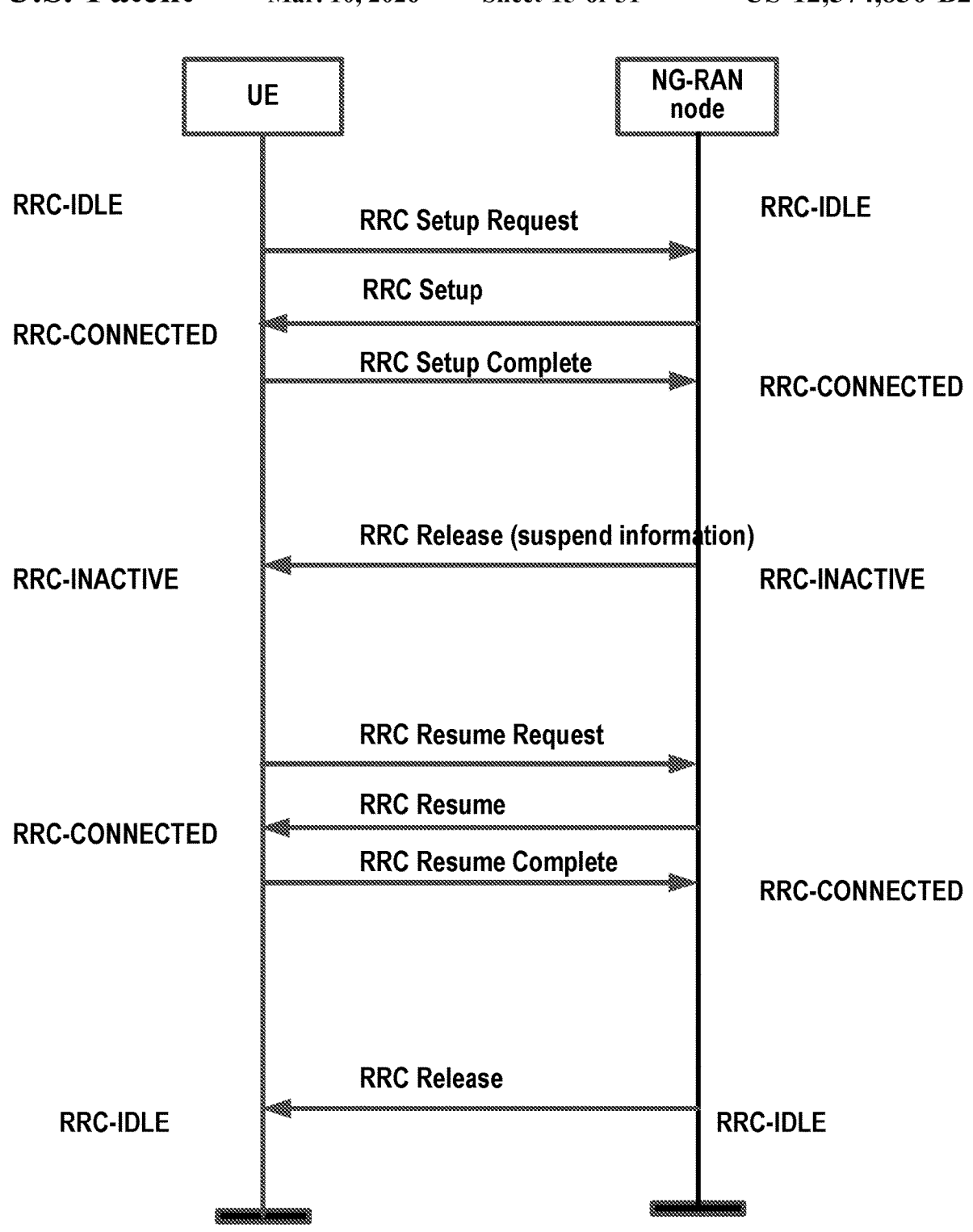
FIG. 15 illustrates an aspect of an example embodiment of a present disclosure.

FIG. 15 illustrates an example call flow for four RRC state transitions in accordance with embodiments of the present disclosure. The four RRC state transitions include: RRC-IDLE to RRC-CONNECTED; RRC-CONNECTED to RRC-INACTIVE; RRC-INACTIVE to RRC-CONNECTED; and RRC_CONNECTED to RRC-IDLE. It should be noted that, although the four RRC state transitions are shown as part of a single call flow diagram, each RRC state transition call flow can be performed independently from each other.

Starting with the RRC state transition from RRC-IDLE to RRC-CONNECTED, a UE in RRC-IDLE may send an RRC setup request message to an NG-RAN node (e.g., a gNB) to request RRC connection setup with the NG-RAN. The UE may receive an RRC setup message from the NG-RAN node in response to the RRC setup request message. The UE may transition from the RRC-IDLE to RRC-CONNECTED in response to the RRC setup message from the NG-RAN node. The RRC state maintained at the UE may be updated to reflect that the current RRC state of the UE is RRC-CONNECTED after the state transition. The UE may respond to the RRC setup message by sending an RRC setup complete message to the NG-RAN. The RRC state maintained at the NG-RAN node may be updated to reflect that the current RRC state of the UE is RRC-CONNECTED after receiving the RRC setup complete message.

For the RRC state transition from RRC-CONNECTED to RRC-INACTIVE, the NG-RAN node may send an RRC release message to the UE to request suspension of an RRC connection. In an example, the RRC release message may include suspend information that indicates to the UE that the RRC release message is for suspending instead of releasing the RRC connection. The suspend information may comprise a radio network temporary identity (RNTI) value, a radio access network (RAN) paging cycle, RAN notification area information, and/or the like. The UE may transition from RRC-CONNECTED to RRC-INACTIVE in response to the RRC release message from the NG-RAN node. The RRC state maintained at both the UE and the NG-RAN node may be updated to reflect that the current RRC state of the UE is RRC-INACTIVE.

For the RRC state transition from RRC-INACTIVE to RRC-CONNECTED, the UE may send an RRC resume request message to the NG-RAN node to request that the suspended RRC connection be resumed. The UE may receive an RRC resume message from the NG-RAN node in response to the RRC resume request message. In response to the RRC resume message from the NG-RAN node, the UE may transition from RRC-INACTIVE to RRC-CONNECTED state and may send an RRC resume complete message to the NG-RAN node. The RRC state maintained at the UE may be updated to reflect that the current RRC state of the UE is RRC-CONNECTED after the state transition. The RRC state maintained at the NG-RAN node may be updated to reflect that the current RRC state of the UE is RRC-CONNECTED after receiving the RRC resume complete message from the UE.

Finally, for the RRC state transition from RRC-CONNECTED to RRC-IDLE, the NG-RAN node may send an RRC release message to the UE to request that the RRC connection be released. The UE may transition from RRC-CONNECTED to RRC-IDLE after receiving RRC release message from the NG-RAN node. The RRC state maintained at both the UE and the NG-RAN node may be updated to reflect that the current RRC state of the UE is RRC-IDLE.

Figure 16:
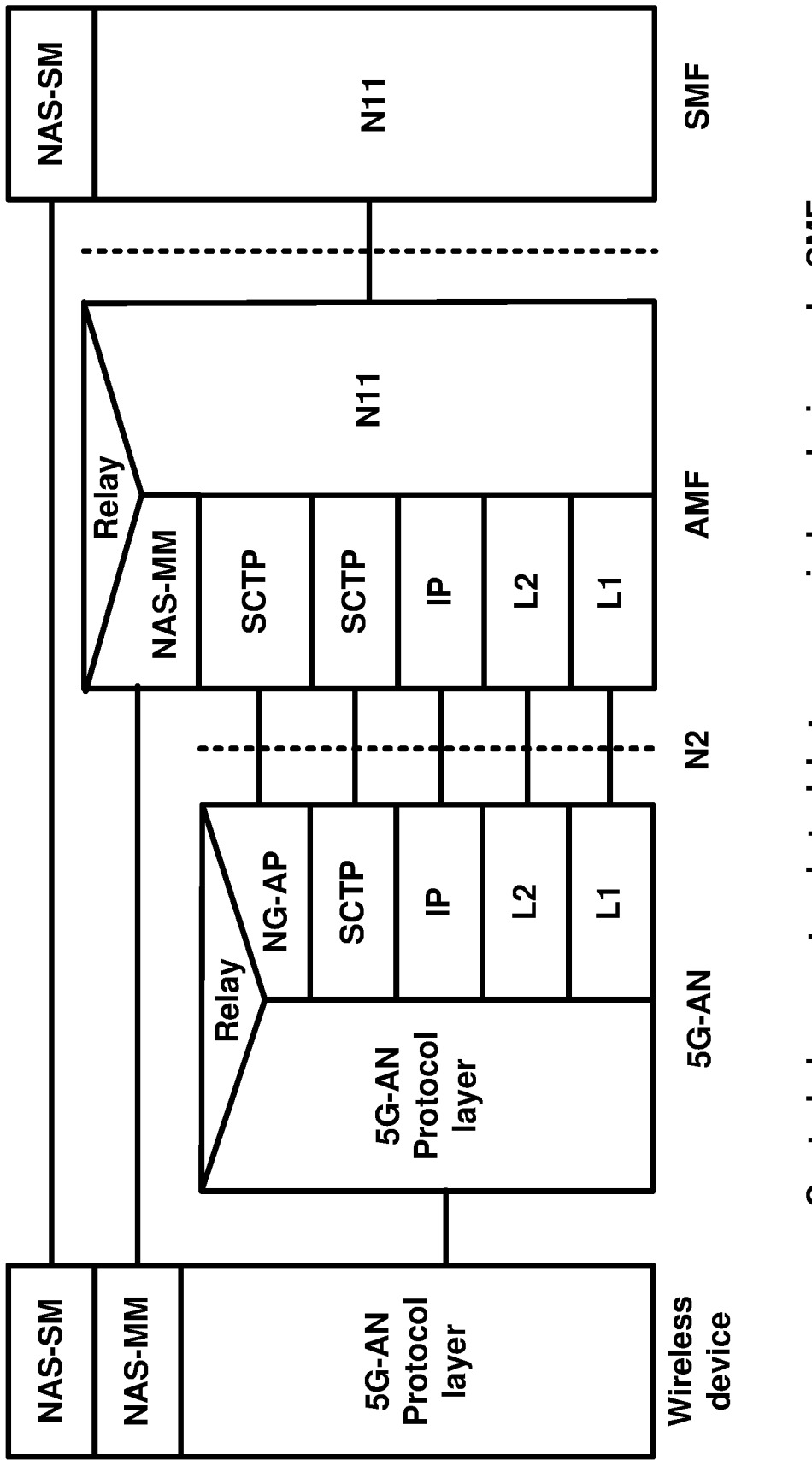

A NAS-SM may support a handling of session management between a wireless device and a SMF. In an example, a session management (SM) signaling message may be handled (e.g. created and processed) in a NAS-SM layer of the wireless device and the SMF as depicted in FIG. 16. A content of the SM signaling message may be not interpreted by an AMF. In an example, the content of the SM signaling message may be transparent to the AMF. A NAS-MM layer may employ a transmission and reception of the SM signaling message by piggybacking the SM signaling message into a mobility management (MM) signaling message. The SM signaling message may be a 5GSM message, 5GSM signaling message, NAS-SM message, and/or the like. The MM signaling message may be a 5GMM message, 5GMM signaling message, NAS-MM message, and/or the like.

For transmission of the SM signaling message, the NAS-MM layer may create a MM signaling message (e.g. NAS-MM message) comprising a security header, an indicator indicating NAS transport of SM signaling, and additional information for the receiving NAS-MM to derive how and where to forward the AMF signaling message. For reception of the SM signaling, the NAS-MM may process the NAS-MM part of the message. In an example, the processing of the NAS-MM may comprise performing an integrity check, and/or interpreting the additional information to derive how and where to derive the SM signaling message.

A 5GS session management (5GSM) message may be piggybacked in 5G mobility management (5GMM) transport message. The 5GSM message may be transmitted as an information element (IE) in the 5GMM transport message. In an example, the wireless device, the AMF, and the SMF may execute a 5GMM procedure and the 5GSM procedure in parallel. Success of the 5GMM procedure may not be dependent on the success of the piggybacked 5GSM procedure.

In an example, the 5GMM message piggybacking the 5GSM message may be an uplink NAS transport message. FIG. 17 depicts a message content of the uplink NAS transport message. The wireless device may send the uplink NAS transport message if the wireless device needs to send a control signaling message to network functions (e.g. SMF, SMS, PCF, and/or the like) via/through the AMF. A wireless device may send via a base station to an AMF, an uplink (UL) NAS transport message piggybacking a 5GSM message for session management request (e.g. PDU session establishment, PDU session modification, and/or the like). As depicted in FIG. 17, the uplink NAS transport message may comprise an uplink NAS transport message identity, a payload container type, a payload container, a PDU session identity (ID), an old PDU session identity, a request type, an S-NSSAI, a DNN, additional information, and/or the like. In an example, the uplink NAS transport message identity may indicate that this is an uplink NAS transport message. The payload container type may indicate a type of payload included in the payload container (e.g. payload container IE). In an example, the payload container type may comprise a N1 SM information, SMS, LTE positioning protocol (LPP) message container, a UE policy container, a UE parameters update transparent container, and/or the like. The wireless device may include the PDU session identity in response to the payload container type being the N1 SM information. The wireless device may include the old PDU session identity if the uplink NAS transport message transports a PDU session establishment request message in response to receiving a PDU session modification command message with the 5GSM cause IE set to #39 "reactivation requested" and the payload container type IE is set to "N1 SM information". The request type may indicate a purpose of a 5GSM message. The request type may comprise an initial request, existing PDU session, initial emergency request, existing emergency DPU session, modification request, and/or the like. The wireless device may include the S-NSSAI if the request type is "initial request" or "existing PDU session" and the payload container type IE is "N1 SM information". The S-NSSAI may indicate a slice which is related to a service type for the session establishment. The wireless device may include the DNN if the request type is "initial request" or "existing PDU session" and the payload container type information element is "N1 SM information".

Figure 19:
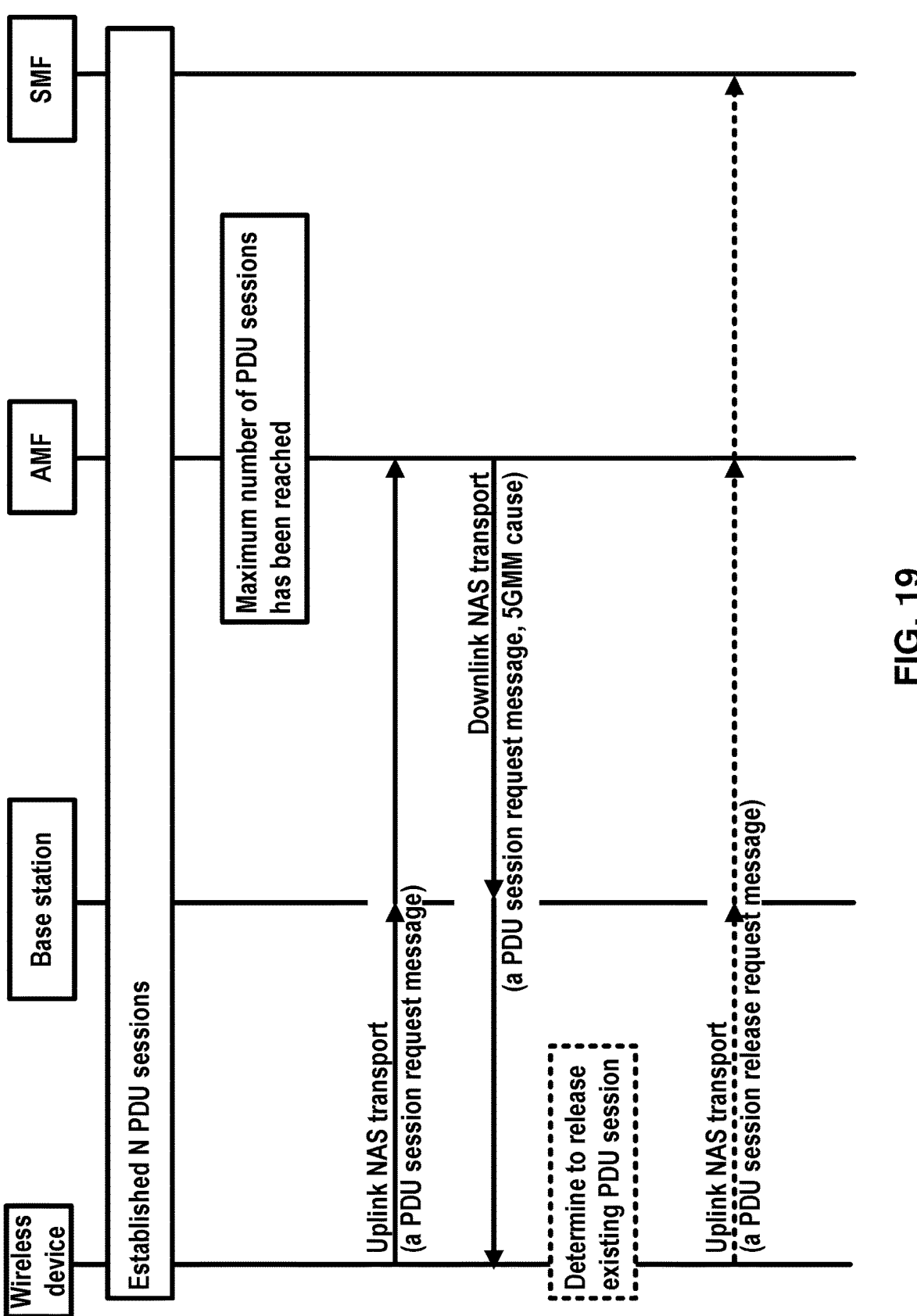
FIG. 19 illustrates an aspect of an example embodiment of a present disclosure.

In an example embodiment as depicted in FIG. 19, an AMF may reject a new PDU session establishment request if the establishment would cause a maximum number of PDU sessions of the wireless device to be exceeded. In an example, the wireless device may have N number of active PDU sessions. The wireless device may send an uplink NAS transport message to an AMF to request an establishing of a new PDU session. The uplink NAS transport message may comprise a payload container type IE, a payload container, a PDU session identity, a request type IE, a N-NSSAI, a DNN, and/or the like. The payload container type may be "N1 SM information". The payload container may comprise a PDU session establishment request message. The PDU session identity may indicate a new PDU session identity. The request type may be "initial request" or "existing PDU session". The S-NSSAI may be a slice for the new PDU session request and the DNN may be data network name for the new PDU session request.

In an example, an AMF may receive the uplink NAS transport message. The AMF may determine that the PLMN's maximum number of PDU sessions has reached for the wireless device based on a local policy, a subscription information of the wireless device, a load condition of the PLMN, a number of active PDU session for the wireless device, and/or the like. The AMF may not forward the payload container (e.g. a PDU session establishment request message, session request message) in response to the determination (e.g. the PLMN's maximum number of PDU session has reached for the wireless device). The AMF may not forward the payload container if the payload container comprising a request of a new PDU session establishment in response to detecting that the PLMN's maximum number of PDU session has been reached for the wireless device. The AMF may determine the received payload container in the uplink NAS transport message comprising a new PDU session establishment in response to the payload container type IE being "N1 SM information", the Request type IE being "initial request" or "existing PDU session". If the AMF determines that the PLMN's maximum number of PDU sessions has already been reached for the wireless device, the AMF may send back to the wireless device the payload container (e.g. 5GSM message) which was not forwarded to the SMF and indicate 5GMM cause #65 "maximum number of PDU sessions reached". The AMF may piggyback the 5GSM message and the 5GMM cause to a downlink NAS transport message as depicted in the FIG. 19. In an example, the wireless device may receive the downlink NAS transport message comprising the 5GMM cause and the 5GSM message. The wireless device may determine a PLMN's maximum PDU sessions based on the received 5GMM cause indicating "maximum number of PDU sessions reached". The Active PDU sessions may be PDU sessions which are successfully established and not released. The wireless device may determine a PLMN's maximum PDU sessions as number N in response to receiving the 5GMM cause.

A maximum number of PDU sessions which a wireless device is allowed to establish in a PLMN may be determined/limited by a lowest of: a maximum number of PDU session IDs allowed by a protocol (e.g. a NAS protocol), the PLMN's maximum PDU session, and the wireless device's implementation-specific maximum number of PDU sessions. The maximum number of PDU session IDs, which is allowed by the protocol, may be 15 PDU sessions. The PLMN's maximum number of PDU sessions may be determined during a UE requested PDU session establishment procedure. In an example, a wireless device (e.g. UE) may send a PDU session establishment message to an SMF via an AMF, to request an establishment of a new PDU session. The wireless device may receive an indication that PDU session establishment message (e.g., 5GSM message) was not forwarded to the SMF because the PLMN's maximum number of PDU session has been reached. The wireless device may determine that the PLMN's maximum number of PDU sessions as the number of active PDU session it has in response to receiving the indication. In an example, the wireless device may have a 3 active PDU sessions and may receive the indication after the wireless device requests an establishment of a 4 the PDU session. The wireless device may determine that the PLMN's maximum number of PDU sessions is three based on the wireless device having 3 active PDU sessions. The wireless device's implementation-specific maximum number of PDU sessions may be a number of PDU sessions supported by the wireless device. In an example, the wireless device may support less than 15 PDU sessions to decrease an implementation complexity. In an example, the wireless device may determine the maximum number of PDU sessions as three in response to the lowest number of the maximum number of PDU sessions being three.

The PLMN's maximum number of PDU sessions may apply to the PLMN in which the 5GMM cause #65 "maximum number of PDU sessions reached" is received. When the wireless device is switched off or when the USIM is removed, the wireless device may clear/delete all previous determinations representing PLMN's maximum number of PDU sessions. Upon successful registration with a new PLMN, the UE may clear previous determinations representing any PLMN's maximum number(s) of PDU sessions.

If the maximum number PDU sessions is reached at the wireless device and the upper layers of the wireless device request connectivity to a data network, the wireless device may not send a PDU session establishment message to establish a new PDU session. The wireless device may release existing PDU sessions to establish a new PDU session. If the wireless device determines to release an established/existing PDU session, choosing which PDU session to release may be implementation specific. In an example, the existing PDU sessions may be low priority PDU sessions. The wireless device may not release an emergency PDU session.

If the UE needs/determines to release a PDU session in order to request an emergency PDU session, the wireless device may perform a local release of a PDU session or release a PDU session via explicit signaling. If the wireless device performs a local release, the wireless device may perform a registration procedure for mobility and periodic registration update to indicate PDU session status to the network.

In an example, the AMF may detect and start performing DNN based congestion control when one or more DNN congestion criteria are met. The AMF may store a DNN congestion back-off timer on a per UE and congested DNN basis. If the UE does not provide a DNN for a non-emergency PDU session, then the AMF may employ the selected DNN or the DNN associated with the PDU session corresponding to the 5GSM procedure. When DNN based congestion control is activated at the AMF, the AMF may perform the congestion control and the UE may perform the congestion control. The AMF may detect and start performing S-NSSAI based congestion control when one or more S-NSSAI congestion criteria are met. The AMF may store an S-NSSAI congestion back-off timer on a per UE, congested S-NSSAI, and optionally DNN basis. If the UE does not provide a DNN for a non-emergency PDU session, then the AMF may employ the selected DNN or the DNN associated with the PDU session corresponding to the 5GSM procedure. If the UE does not provide an S-NSSAI for a non-emergency PDU session, then the AMF may employ the selected S-NSSAI or the S-NSSAI associated with the PDU session corresponding to the 5GSM procedure. When S-NSSAI based congestion, control is activated at the AMF, the AMF may perform the congestion control and the UE may perform the congestion control.

In an example embodiment, the network may detect and start performing DNN based congestion control when one or more DNN congestion criteria are met. The network may store a DNN congestion back-off timer on a per UE and congested DNN basis. If the UE does not provide a DNN for a non-emergency PDU session, then the network may use the selected DNN. In the UE, 5GS session management timers T3396 for DNN based congestion control are started and stopped on a per DNN basis. The DNN associated with T3396 may be the DNN provided by the UE during the PDU session establishment. If no DNN is provided by the UE along the PDU session establishment request, then T3396 may be associated with no DNN. For this purpose the UE may retain/store the DNN provided to the network during the PDU session establishment. The timer T3396 associated with no DNN may never be started due to any 5GSM procedure related to an emergency PDU session. If the timer T3396 associated with no DNN is running, it may not affect the ability of the UE to request an emergency PDU session. If T3396 is running or is deactivated, and the UE is a UE configured for high priority access in selected PLMN, then the UE may be allowed to initiate 5GSM procedures for the respective DNN or without a DNN.

In an example embodiment, the network may detect and start performing S-NSSAI based congestion control when one or more S-NSSAI congestion criteria are met. The network may store an S-NSSAI congestion back-off timer on a per UE, S-NSSAI, and optionally DNN basis. If the UE does not provide a DNN for a non-emergency PDU session, then the network may use the selected DNN. If the UE does not provide an S-NSSAI for a non-emergency PDU session, then the network may use the selected S-NSSAI. In the UE, 5GS session management timers T3584 for the S-NSSAI based congestion control may be started and stopped on a per S-NSSAI and DNN basis. In the UE, 5GS session management timers T3585 for the S-NSSAI based congestion control may be started and stopped on a per S-NSSAI basis. The S-NSSAI associated with T3584 may be the S-NSSAI provided by the UE during the PDU session establishment. The DNN associated with T3584 may be the DNN provided by the UE during the PDU session establishment. If no S-NSSAI but DNN is provided by the UE along the PDU session establishment request message, then T3584 is associated with no S-NSSAI and a DNN provided to the network during the PDU session establishment. If no DNN but S-NSSAI is provided by the UE along the PDU session establishment request message, then T3584 may be associated with no DNN and an S-NSSAI provided to the network during the PDU session establishment. If no DNN and no S-NSSAI is provided by the UE along the PDU session establishment request message, then T3584 may be associated with no DNN and no S-NSSAI. For this purpose, the UE may retain/store the DNN and S-NSSAI provided to the network during the PDU session establishment. The timer T3584 associated with no DNN and an S-NSSAI may never be started due to any 5GSM procedure related to an emergency PDU session. If the timer T3584 associated with no DNN and an S-NSSAI is running, it may not affect the ability of the UE to request an emergency PDU session. The S-NSSAI associated with T3585 may be the S-NSSAI provided by the UE during the PDU session establishment. If no S-NSSAI is provided by the UE along the PDU SESSION ESTABLISHMENT REQUEST message, then T3585 may be associated with no S-NSSAI. If T3584 is running or is deactivated, and the UE may be a UE configured for high priority access in selected PLMN, then the UE may be allowed to initiate 5GSM procedures for the respective S-NSSAI or [S-NSSAI, DNN] combination. If T3585 is running or is deactivated, and the UE is configured for high priority access in selected PLMN, then the UE may be allowed to initiate 5GSM procedure for the respective S-NSSAI.

Figure 20:
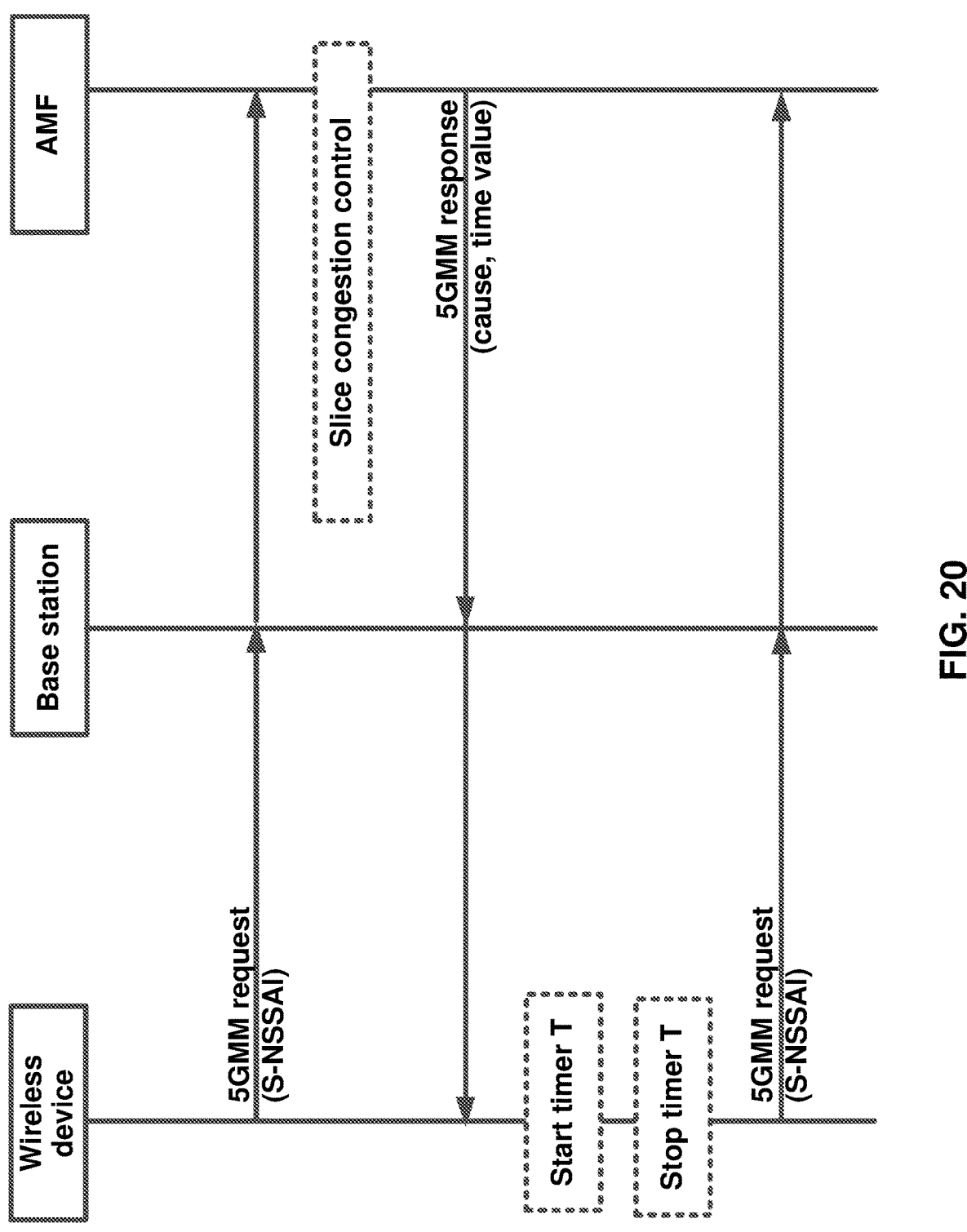
FIG. 20 illustrates an aspect of an example embodiment of a present disclosure.

In an example embodiment as depicted in FIG. 20, an AMF may perform a NAS level congestion control if the AMF detects signaling congestion condition/situation. Under a 5GMM signaling congestion conditions, the AMF may reject 5GMM signaling requests from wireless devices. Under a 5GSM signaling congestion conditions, the AMF may reject 5GSM signaling request from wireless devices. In an example, one or more SMFs may detect signaling congestion condition/situation and the one or more SMFs may send an indication to serving AMF the 5GSM signaling congestion condition. The AMF may employ a 5GSM related congestion control in response to receiving the indication. In an example, 5GSM signaling congestion condition may be for a specific slice. In an example, 5GSM signaling congestion condition may be for a specific slice and a specific DNN.

In an example, the wireless device may send a 5GMM request message to an AMF via a base station. The 5GMM request message may be an uplink NAS transport message. In an example, the uplink NAS transport message may piggyback a payload container, S-NSSAI, DNN, and/or the like. In an example, the AMF may employ a NAS level congestion control for a specific slice. The AMF may employ the NAS level congestion control for the specific slice in response to receiving an indication indicating that the specific slice is congested from an SMF. In an example, the SMF may serve the specific slice. The AMF may determine do not forward the received payload container to the SMF if the S-NSSAI indicates the specific slice. The AMF may determine to reject the 5GMM request and send a 5GMM response message to the wireless device in response to determining do not forward the received payload container. The 5GMM response message may be a downlink NAS transport message. The 5GMM response message may comprise a cause, a time value, the payload container, and/or the like. In an example, the cause may be a 5GMM cause and may indicate "insufficient resources for specific slice". The cause may be a 5GMM cause #69 and may indicate "insufficient resources for specific slice". The time value may be associated to the cause. The time value may be an associated back-off time value to the cause. In an example, the time value may comprise a few seconds, a few minutes, tens of minutes, a few hours, and/or the like. The wireless device may start a timer T based on the time value. In an example the timer T may be T3585. In an example, the wireless device is not allowed to initiate a PDU session establishment procedure, a PDU session modification procedure for the specific slice (e.g. the S-NSSAI) while the timer T running. In an example, the wireless device is allowed to initiate a PDU session release procedure for the specific slice while the timer T running. In an example, the wireless device is not allowed to initiate a PDU session establishment procedure, a PDU session modification procedure for the specific slice during the time period based on the time value in response to receiving the downlink NAS transport message. If the timer period passed (timer T) or the timer period expires, the wireless device may send a PDU session establishment request message, a PDU session modification request message for the specific slice.

Figure 21:
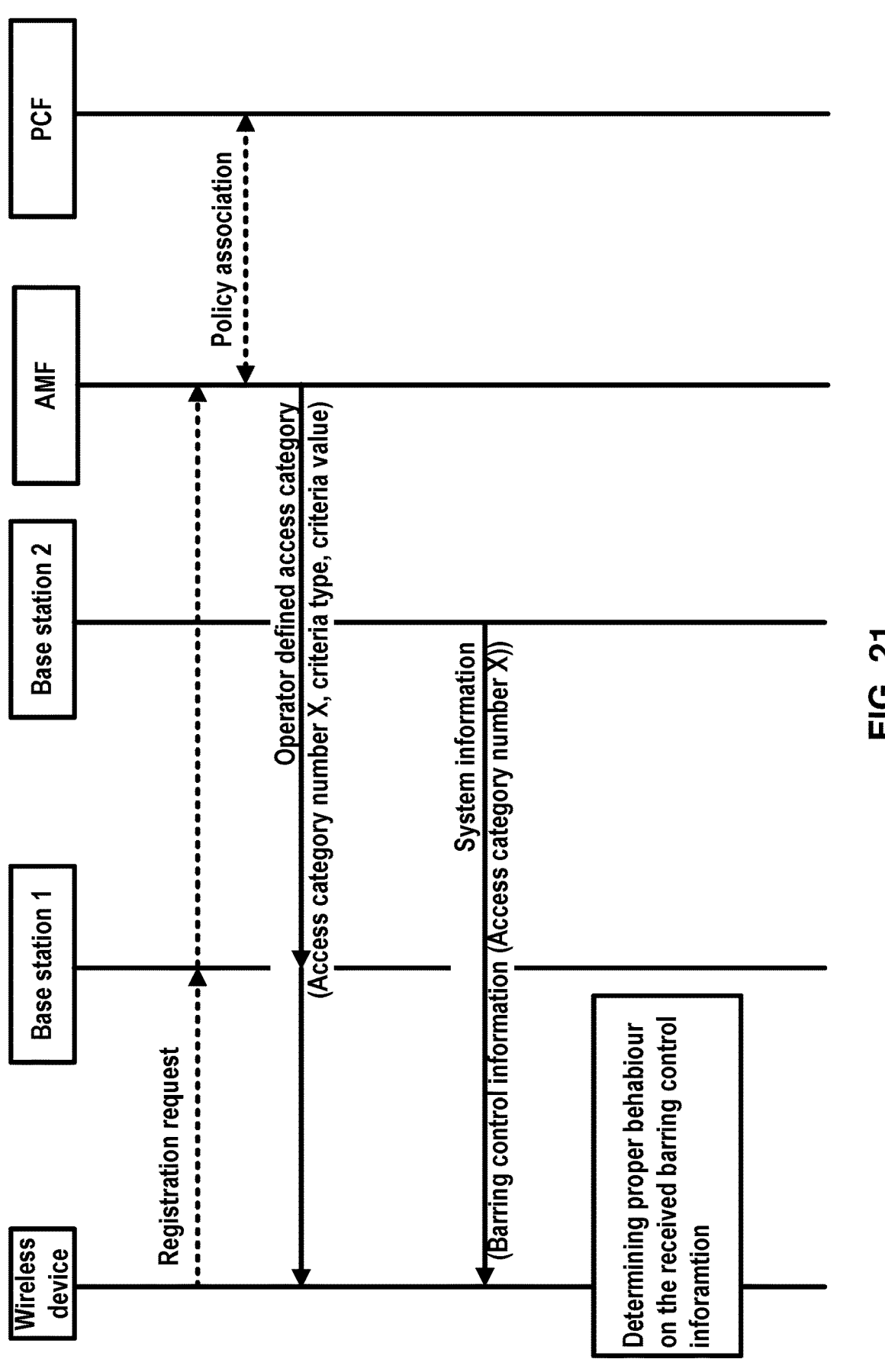
FIG. 21 illustrates an aspect of an example embodiment of a present disclosure.

Under high network load conditions, the network may protect itself against overload by using a unified access control functionality to limit access attempt form wireless devices. Depending on network configuration, the network may determine whether certain access attempt should be allowed of blocked based on categorized criteria. A base station may broadcast barring control information associated with access categories and access identities. The base station may initiate the unified access control based on a request from AMFs, OAN or triggered by the base station itself. The request from AMFs may be based on an overload start message. AMFs may send an overload start message to the base station to request employment of the unified access control. Operator may provide one or more PLMN-specific operator-defined access category definitions to the wireless device using NAS signaling. In an example, the NAS signaling may be a registration procedure, a UE configuration update procedure. As depicted in FIG. 21, the wireless device may receive an operator defined access category. The operator defined access category may be included in a registration accept message in response to a received registration request message. The operator defined access category may be included in a UE configuration update message. The operator defined access category may be per PLMN and may range from 32 to 63. In an example, the AMF may configure mapping information of the operator defined access category comprising an access category number (e.g. range from 32 to 63) and associated criteria type/criteria. The criteria type/criteria of the operator defined access category may be for specific slice (e.g. S-NSSAI), specific operating system and/or specific application identity, and/or the like.

The wireless device may transition to an inactivity state. The Inactivity state may be a state that there is no active data transmission/reception between the wireless device and the base station. The wireless device in the inactivity state may be in CM-IDLE/RRC-IDLE state or CM-CONNECTED/RRC-INACTIVE state. The wireless device in the inactivity state may require transitioning to activity state (e.g. CM-CONNECTED/RRC-CONNECTED state). If a wireless device in the inactivity state require to transition to an activity state, the wireless device may need to send an RRC connection request message to a base station. The RRC connection request message may be an RRC setup request message or an RRC resume request message. Before the wireless device sending the RRC connection request message, the wireless device may check whether the wireless device is allowed to access to the base station by employing the unified access control. To employing the unified access control, the wireless device may receive system information from the base station and acquire barring control information. In an example, the barring control information may be unified access control (UAC) barring information. The barring control information may comprise PLMN specific control information and the PLMN specific control information may apply to a wireless device access to the PLMN via the base station. In an example, the barring control information may comprise access category/access category number and barring information of the access category. In an example, the base station may bar an access category 32 (e.g. access category 32 barred) and the wireless device may check the operator defined access category associated to the access category 32. If the RRC connection request is related to the operator defined access category and the criteria, the wireless device may not access to the base station. In an example, the operator defined access category 32 of the wireless device is associated an S-NSSAI A and the base station broadcast the access category 32 is barred. In an example, the wireless device may trigger the RRC connection request to establish a PDU session for the S-NSSAI A. The wireless device may not send the RRC connection request in response to the S-NSSAI A (e.g., access category 32) being barred to access to the base station. In an example, the S-NSSAI A may be barred by the base station in response to receiving an overload start message for the S-NSSAI from the AMF.

A network slice may be a logical network that provides specific network capabilities and network characteristics. A 5G network may employ the network slice to provide tailored services to specific customer groups and or individual customers. A mobile network operator may adopt attributes for the network slice to provide the tailored services to the customers. The attributes of the network slice may comprise number of wireless devices per network slice, number of connections per network slice, maximum uplink/downlink throughput per wireless device per network slice, and/or the like. The attributes may be input to scale the network slice and provide enough resources to the network. A 5G network may require supporting management/handling of the network slice based on the attributes for slice. In an example, the maximum number of sessions for a network slice A may be 100 sessions. In an example, the maximum number of sessions for a network slice B may be 10,000 sessions. Based on the maximum number of sessions, management of the network slice A and the network slice B may be different. The maximum number of sessions may be per network slice. The maximum number of sessions may be not per wireless device for the network slice. To provide fairness among the wireless devices, the maximum number of sessions per network slice may be managed per wireless device for the network slice.

In existing technology, a session management function (SMF) may handle session control for a wireless device. As a part of the session handling, the SMF may handle the maximum number of sessions per slice to employ the attributes for slice. When the wireless device tries to establish a session associated with the slice, the wireless device sends a session management message to the SMF. As a part of the session handling, the SMF may determine that the establishment of the session is to be rejected, because the maximum number for the slice has been reached. This may increase a delay due to the distance (e.g., geographic distance) between the wireless device and the SMF. Moreover, communications between the wireless device and the SMF cause high levels of signaling overhead traveling through intermediate network elements. For wireless devices to access the network slice, an improved session management handling to control the attributes (e.g., maximum number of sessions) is needed to increase resource utilization efficiency and to guarantee quality of service of the wireless devices.

To reduce delay and signaling overhead, example embodiments may enable the wireless device and/or other network functions (e.g., network functions that are less distant from the wireless device) to facilitate session handling. In particular, if it is necessary to reject an establishment request for a session associated with a particular slice, delay and signaling overhead can be reduced by handling the rejecting at a network function that is less distant from the wireless device. Additionally or alternatively, delay and signaling overhead may be reduced by providing information about slice attributes to the wireless device.

In an example embodiment, an access and mobility management function (AMF) may send an indication to a wireless device of a maximum number of PDU sessions which is allowed for a specific slice (e.g. network slice). The specific slice may employ an attribute "maximum connections per network slice". The wireless device may handle management of one or more PDU sessions for the specific slice based on the indication. In an example, the wireless device may release a low priority PDU session for the slice and may request to establish a higher priority PDU session for the slice. In an example, the wireless device request to modify an existing PDU session of the slice to get a proper service for new application for the slice. Accordingly, delay and signaling overhead may be reduced.

According to an embodiment, the AMF may send back to the wireless device, a received session management (SM) message from the wireless device, to indicate rejection for the SM message. The AMF may construct a reject message and send the reject message to the wireless device, thereby reducing latency and avoiding additional signaling with the SMF. To reduce complexity, the AMF may simply return the SM message to the wireless device, thereby indicating rejection of the session establishment. If the wireless device receives the same SM message that the wireless device sent to the AMF, the wireless device may determine that a procedure associated with the SM message is rejected. Additionally or alternatively, the AMF may indicate the maximum number of sessions per slice and/or a cause value indicating that the maximum number of sessions per slice is reached. Accordingly, delay and signaling overhead may be reduced.

According to an embodiment, the AMF may indicate a maximum number of PDU sessions per network slice allowed to the wireless device. As a result, the wireless device may proactively avoid unnecessary PDU session requests, thereby reducing delay and signaling overhead.

According to an embodiment, the AMF may indicate a maximum number of PDU sessions per network slice allowed to the wireless device. The AMF may indicate the maximum number of PDU sessions per network slice allowed to the wireless device, in response to reception of a registration request message from the wireless device. As a result, the wireless device may proactively avoid unnecessary PDU session requests, thereby reducing delay and signaling overhead.

According to an embodiment, the AMF may indicate the maximum number of PDU sessions per network slice allowed to the wireless device by sending a UE configuration update message. The UE configuration update message may comprise the maximum number of PDU sessions per network slice allowed to the wireless device. As a result, the AMF may indicate up to date value for the maximum number of PDU sessions per network slice allowed to the wireless device, thereby reducing delay and signaling overhead.

According to an embodiment, the AMF may send a first access category to the wireless device, indicating that the first access category restricts an allowed number of sessions for a network slice. The wireless device may receive barring information comprising the first access category from a base station. Based on the first access category, the wireless device may send a radio resource control (RRC) message if the network slice is not barred based on the number of sessions. Thereby reducing delay and signaling overhead.

Figure 22:
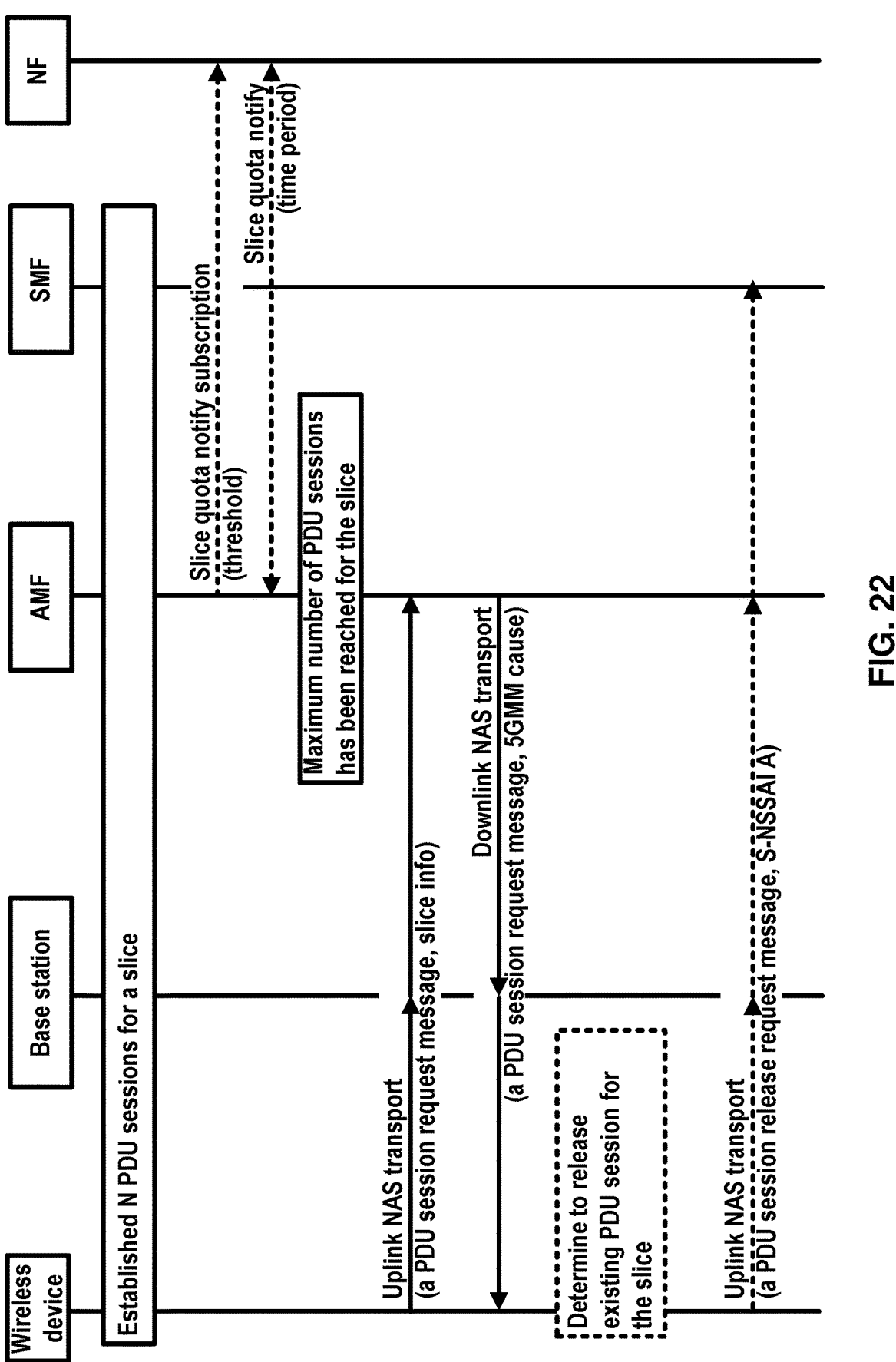
FIG. 22 illustrates an aspect of an example embodiment of a present disclosure.

FIG. 22 illustrates an example embodiment of present disclosure. As depicted in FIG. 22, a wireless device has registered an AMF of a PLMN, and has established N (e.g., 2) PDU sessions for a slice (S-NSSAI). The PLMN may support the slice and may employ attributes "number of connections (e.g. maximum 1000 PDU sessions)". In an example, the AMF may receive an indication indicating that a PDU session quota (e.g. connections quota) of the slice is reached/exceeded. The indication may be in response to a quota notification subscription by the AMF for the slice. The AMF may provide a threshold value (e.g. 90%, 100%) for the quota notification. The network function may send a slice quota notify message in response to meet/occur/detect the threshold value for the slice. The slice quota notify message may comprise a time period in which the threshold value or an overload situation may be continued. In an example, the network function may be a network data analytics function. In an example implementation, the AMF may receive an allowed maximum number of PDU session of the slice for the wireless device from a network function or based on local policy.

The AMF may determine that a new session establishment request by a wireless device may cause a maximum number of PDU sessions for the slice to be exceeded. In an example, the maximum number of PDU sessions may be per slice. In an example, the maximum number of PDU sessions may be per wireless device for the slice.

In an example, the AMF may receive a slice quota notify message from a network function indicating that the slice quota is exceeded/reached. The AMF may determine to reject a new PDU session establishment request for the slice from a wireless device. In an example, the AMF may receive a slice quota notify message from a network function indicating that the slice quota 90% is reached. The AMF may determine to limit a maximum number of PDU sessions of a wireless device for the slice.

In an example, the wireless device may send a 5GMM request message to an AMF via a base station, to request a PDU session establishment for the slice. The PDU session establishment request for the slice may be N+1 PDU sessions for the slice. The 5GMM request message may be an uplink NAS transport message. In an example, the uplink NAS transport message may comprise a payload container type IE, a payload container, a PDU session identity, a request type IE, a N-NSSAI, a DNN, and/or the like. The payload container type may be "N1 SM information". The payload container may comprise a PDU session establishment request message for the slice. The PDU session identity may indicate a new PDU session identity. The request type may be "initial request" or "existing PDU session". The S-NSSAI may be a slice for the new PDU session request and the DNN may be data network name for the new PDU session request.

In an example, an AMF may receive the uplink NAS transport message. The AMF may determine to reject the PDU session establishment for the slice in response to receiving the uplink NAS transport message and based on the determination (e.g., PDU sessions quota exceeded/reached). The determining may be based on a slice quota information (e.g. slice quota exceeded, slice quota approaching 90% usage). The determining may be based on configuration of allowed maximum number of PDU session for the slice. The determining may be further based on a local policy, a subscription information of the wireless device, a load condition of the PLMN, a number of active/established (e.g. N) PDU session for the wireless device, and/or the like. The AMF may determine the received payload container in the uplink NAS transport message comprising a new PDU session establishment for the slice in response to the payload container type IE being "N1 SM information", the Request type IE being "initial request" or "existing PDU session", the S-NSSAI indicating the slice.

In response to determining to reject the PDU session establishment, the AMF may not forward the payload container (e.g. a PDU session establishment request message, session request message) to an SMF and may send a downlink NAS transport message indicating a rejection of the request (e.g. PDU session establishment request). In an example, the downlink NAS transport message may comprise the payload container (e.g. 5GSM message) which was not forwarded to the SMF, 5GMM cause indicating "maximum number of PDU sessions for specific slice reached" in response to the determining. In an example, the 5GMM cause indicating "maximum number of PDU sessions for specific slice reached" may be coded as depicted in FIG. 23. In an example, 5GMM cause value #70 may indicate "maximum number of PDU sessions for specific slice reached".

The wireless device may receive the downlink NAS transport message comprising the 5GMM cause in response to sending the uplink NAS transport message to request a PDU session establishment for the slice. The wireless device may determine that a number of active PDU session for the slice may be at the maximum number of PDU session for the slice in response to receiving the 5GMM cause. In an example, the wireless device may have N established PDU sessions for the slice, the wireless device may determine that the maximum number of PDU session for the slice allowed for the wireless device is N PDU sessions.

In an example, the wireless device may determine to release a low priority PDU session among the existing N PDU session for the slice. The determining may be to establish a new PDU session for the slice. In an example, the new PDU session may be for higher priority service. In an example, the wireless device may request to modify the one of existing PDU session of the slice. The request may be to update QoS setup of the existing PDU session of the slice to get proper service of new application for the slice.

In an example, the wireless device may not send a new PDU session establishment request message for the slice. The wireless device may not send a new PDU session establishment request message for the slice in response to receiving the 5GMM cause "maximum number of PDU sessions for specific slice reached" associated session establishment request of the slice. If the wireless device releases one ore more PDU session for the slice, the wireless device may be allowed to send a new PDU session establishment request message for the slice. The wireless device may be allowed to send a new PDU session establishment request message for a second slice.

In an example implementation, the downlink NAS transport message further comprise a time period/time value associated with the 5GMM cause. The maximum number of PDU session for the slice may be valid/applicable during the time period. In an example, the time value may comprise a few seconds, a few minutes, tens of minutes, a few hours, and/or the like. The wireless device may start a timer T based on the time value in response to receiving the NAS transport message. In an example, the wireless device may start a timer T based on the time value in response to receiving the NAS transport message and transitioning/entering an inactive state (e.g. CM-IDLE/RRC-IDLE, CM-CONNECTED/RRC-INACTIVE). In an example the timer T may be T3585. In an example, the wireless device may not be allowed to initiate a new PDU session establishment procedure during the time period if the new PDU session establishment would cause a maximum number of PDU sessions for the slice to be exceeded. The wireless device may be allowed to initiate PDU session modification procedure for the slice during the time period. The wireless device may be allowed to initiate PDU session release procedure for the slice during the time period. During the time period, the wireless device may be allowed to initiate new PDU session establishment procedure for the slice if one or more existing PDU session has released for the slice. The wireless device may be allowed to initiate a new PDU session establishment procedure for the slice if the time period is expired/passed.

In an example implementation, the 5GMM cause of the downlink NAS transport message may indicate "maximum number of PDU sessions reached and Maximum number of PDU sessions for a specific slice reached". In an example, the 5GMM cause #71 may indicate "maximum number of PDU sessions reached and Maximum number of PDU sessions for a specific slice reached" as depicted in FIG. 23. The wireless device may determine the number of existing PDU sessions (e.g. N PDU session) for the slice may be a maximum number of PDU sessions (N) for the slice in response to receiving the 5GMM cause. The wireless device may determine the number of existing PDU sessions (e.g., M PDU session) may be a PLMN's maximum number of PDU sessions (M).

In an example implementation, a SMF may detect that a maximum number of sessions/connections for a specific slice is exceeded/reached. The SMF may accept or release a PDU session establishment request for the slice from a wireless device. The SMF may release an existing PDU session by sending a PDU session release message comprising a 5GSM cause indicating "maximum number of PDU sessions for a specific slice reached". In an example, the SMF may indicate that "maximum number of PDU sessions for a specific slice reached" during PDU session establishment procedure. In an example, SMF may determine the new PDU session establishment may cause a reaching of the maximum number of sessions/connections quota of the slice. The SMF may send a PDU session establishment accept message comprising the 5GSM cause (e.g., maximum number of PDU sessions for a specific slice reached) to the wireless device, in response to receiving the PDU session establishment request message. The wireless device may determine the existing number of PDU sessions (including newly established PDU session) for the slice is a maximum number of PDU sessions for the slice. The wireless device may not request new PDU session establishment for the slice.

In an example implementation, the maximum number of PDU sessions for the slice may be changed. The change may be based on a change of attributes of the network slice (e.g. the number of connection in network slice attributes increased from 1000 sessions to 10000 sessions). The change may be based on load situation (e.g., one or more sessions for the slice from other wireless devices are released). In an example, an AMF may indicate the change of the maximum number of PDU sessions for the slice to the wireless device if the AMF rejected any PDU session establishment request from the wireless device with 5GMM cause "maximum number of PDU sessions for a specific slice reached". The AMF may send a UE configuration update message to the wireless device indicating a change of a maximum number of PDU session for the slice. The indicating may be "there is no limit for a PDU sessions number for the slice". The indicating may be "allowed PDU sessions for the slice is X".

In an example, an SMF may indicate the change of the maximum number of PDU sessions for the slice to the wireless device if the SMF released any existing PDU session with 5GSM cause "maximum number of PDU sessions for a specific slice reached".

Figure 24:
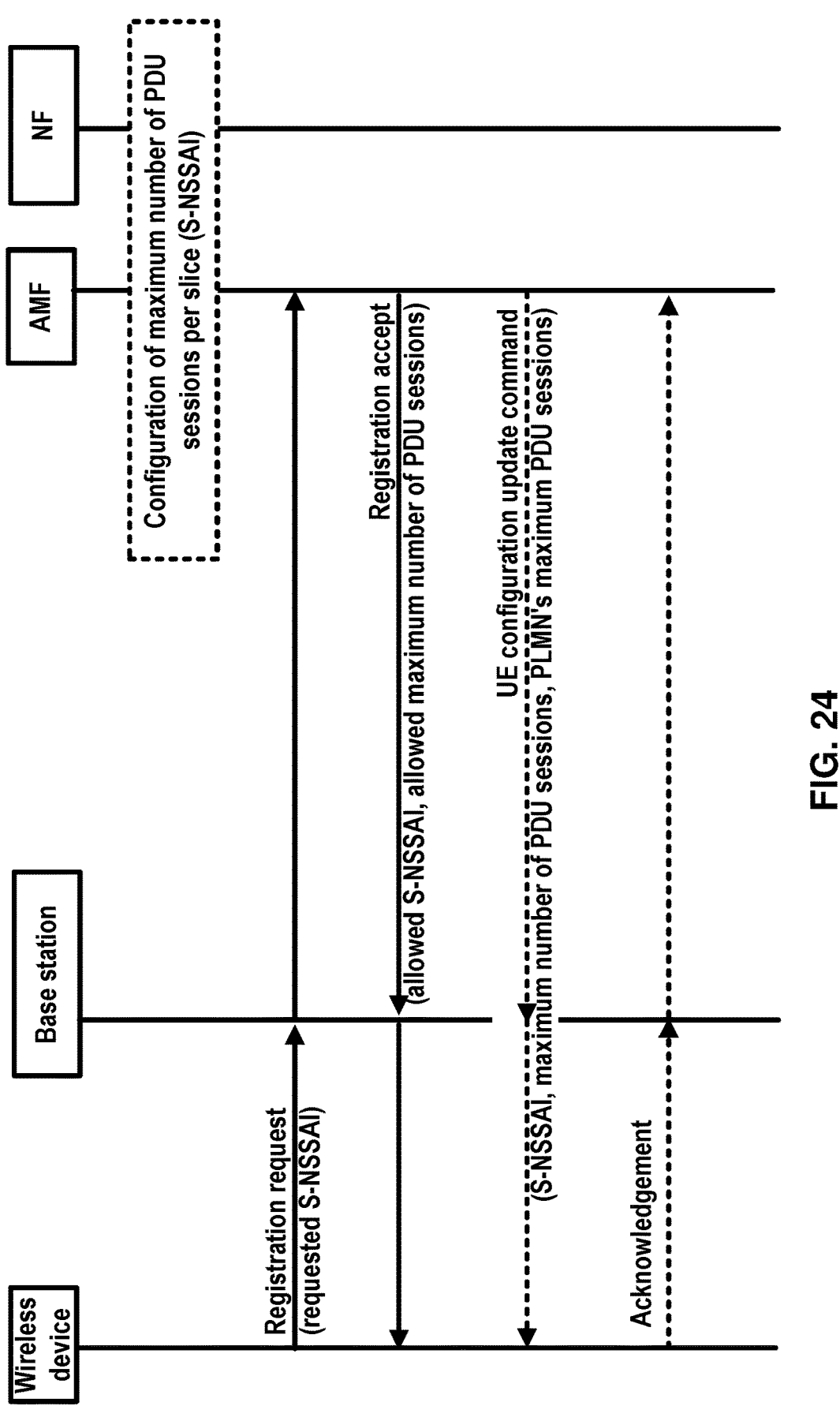
FIG. 24 illustrates an aspect of an example embodiment of a present disclosure.

FIG. 24 illustrates an example embodiment of present disclosure. As depicted in FIG. 24, configuration of maximum number of PDU sessions for one or more slice (S-NSSAI) may be exchanged between an AMF and a network function (NF). The network function may comprise, PCF, NWDAF, and/or the like. In an example, the maximum number of PDU sessions for a slice may be for individual wireless device. In an example, the maximum number of PDU sessions for a slice may be not for individual wireless device and the AMF may determine a maximum number of PDU sessions for a slice for the individual wireless device. The AMF may determine a maximum number of PDU sessions for a slice for a wireless device based on the configuration, local policy, a subscription information of a wireless device, a load condition, and/or the like. In an example, a wireless device may send a registration request message comprising one or more requested S-NSSAI. The AMF may send a registration accept message comprising one ore more allowed S-NSSAIs and allowed maximum number of PDU session for the allowed S-NSSAI based on the determination. The wireless device may determine a maximum number of PDU session for the allowed slice (S-NSSAI) as the allowed maximum number of PDU sessions. The wireless device may be allowed to request a PDU session establishment for a slice within the maximum number of PDU session for the slice. The AMF may update/change the maximum number of PDU sessions for the slice using following registration procedure or via UE configuration update procedure. As depicted in FIG. 24, the AMF may send a UE configuration update command message comprising one or more slice (S-NSSAI) and maximum number of PDU session for the slice. The UE configuration update command message further may comprise a PLMN's maximum number of PDU sessions.

Figure 25:
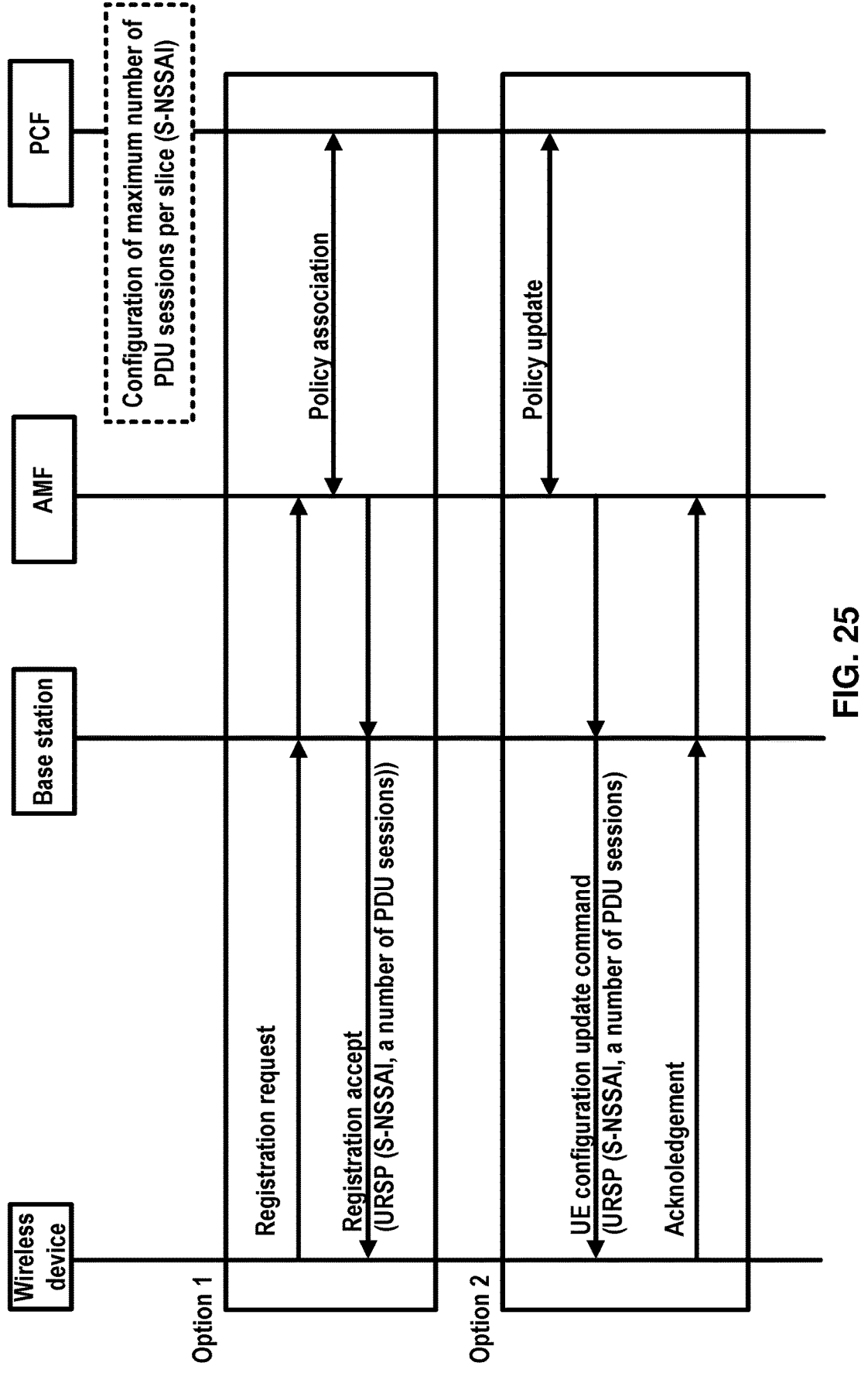
FIG. 25 illustrates an aspect of an example embodiment of a present disclosure.

FIG. 25 illustrates an example embodiment of present disclosure. As depicted in FIG. 25, configuration of maximum number of PDU sessions for one or more slice (S-NSSAI) may be configured in a PCF. In an example, the PCF may provide a UE policy container comprising UE access selection and PDU session selection related policy information to a wireless device via an AMF. The PCF may provide the UE policy container during a registration procedure (as Option 1 in FIG. 25) or a UE configuration update procedure (as Option 2 in FIG. 25). In an example, the UE access selection policy may be an access network discovery & selection policy (ANDSP). The PDU session selection related policy may be a UE route selection policy (URSP). In an example the URSP may be used by the wireless device to determine how to route outgoing traffic. In an example, traffic can be routed to an established PDU Session, can be offloaded to non-3GPP access outside a PDU Session, or can trigger the establishment of a new PDU Session. In an example, the URSP may comprise a prioritized list of URSP rules and the URSP rule may comprise a route selection descriptor. The route selection descriptor may comprise an SSC mode selection, a Network slice selection, a DNN selection, a PDU session type selection, an access type preference, a route selection validation criteria and/or the like. The network slice selection may indicate one or more slice (S-NSSAI) and associated maximum number of PDU session for the slice. The network slice selection may indicate that a traffic of a matching application may be routed via a PDU session supporting nay of the included S-NSSAIs in the network slice selection. In an example, an indication indicating a maximum number of PDU sessions for an associated slice (S-NSSAI) may be a part of the network slice selection. In an example, an indication indicating a maximum number of PDU sessions for an associated slice (S-NSSAI) may be a part of USRP and separated information from the network slice selection. The wireless device may use the maximum number of PDU sessions for an associated slice (S-NSSAI) to determine request a new PDU session for the associated slice or routing via an existing PDU session for the slice. In an example, the wireless device may route via the existing PDU session if the maximum number of PDU sessions is reached based on the maximum number of PDU session (from the URSP) for the slice.

FIG. 26A, FIG. 26B, FIG. 27A, FIG. 27 B illustrates an example embodiment of present disclosure for a unified access control. The operator defined access category of the unified access control may be enhanced to support an access control based on a maximum number of PDU sessions for a slice. The operator defined access category may be per PLMN and may range from 32 to 63. In an example, the AMF may configure mapping information of the operator defined access category comprising an access category number (e.g. range from 32 to 63) and associated criteria type/criteria. The criteria type/criteria of the operator defined access category may be for specific slice (S-NSSAI A), specific operating system and/or specific application identity, for a specific slice (S-NSSAI) and allowed number of PDU session and/or the like. In an example, the 5G network (e.g., AMF) may limit a maximum number of PDU session of a wireless device for a specific slice (S-NSSAI A) to 3 PDU session. The AMF may provide the operator defined access category with criteria type to "S-NSSAI type and allowed number of PDU sessions" (e.g. criterial type 3 in FIG. 27B). In an example, a criteria of the criteria type may comprise S-NSSAI 3 and an allowed PDU session number as 2. An operator defined access category number for the criteria (for S-NSSAI 3 and allowed number of PDU sessions is 2) may be access category number 32. In an example, if the wireless device receives a barring information indicating that the access category 32 is barred, the wireless device may apply the criteria (e.g. for S-NSSAI 3, allowed number of PDU session is 3). In an example, the wireless device may have 2 existing PDU session for the slice (S-NSSAI 3). If upper layer (e.g. application layer) of the wireless device initiate a new PDU session for the slice (S-NSSAI 3), the wireless device does not send RRC connection request in response to the united access barring check. In an example, the wireless device may detect that third PDU session request for the slice (S-NSSAI 3) is not allowed form the PLMN in response to the barring information (e.g., access category 32 is barred).

Figure 28:
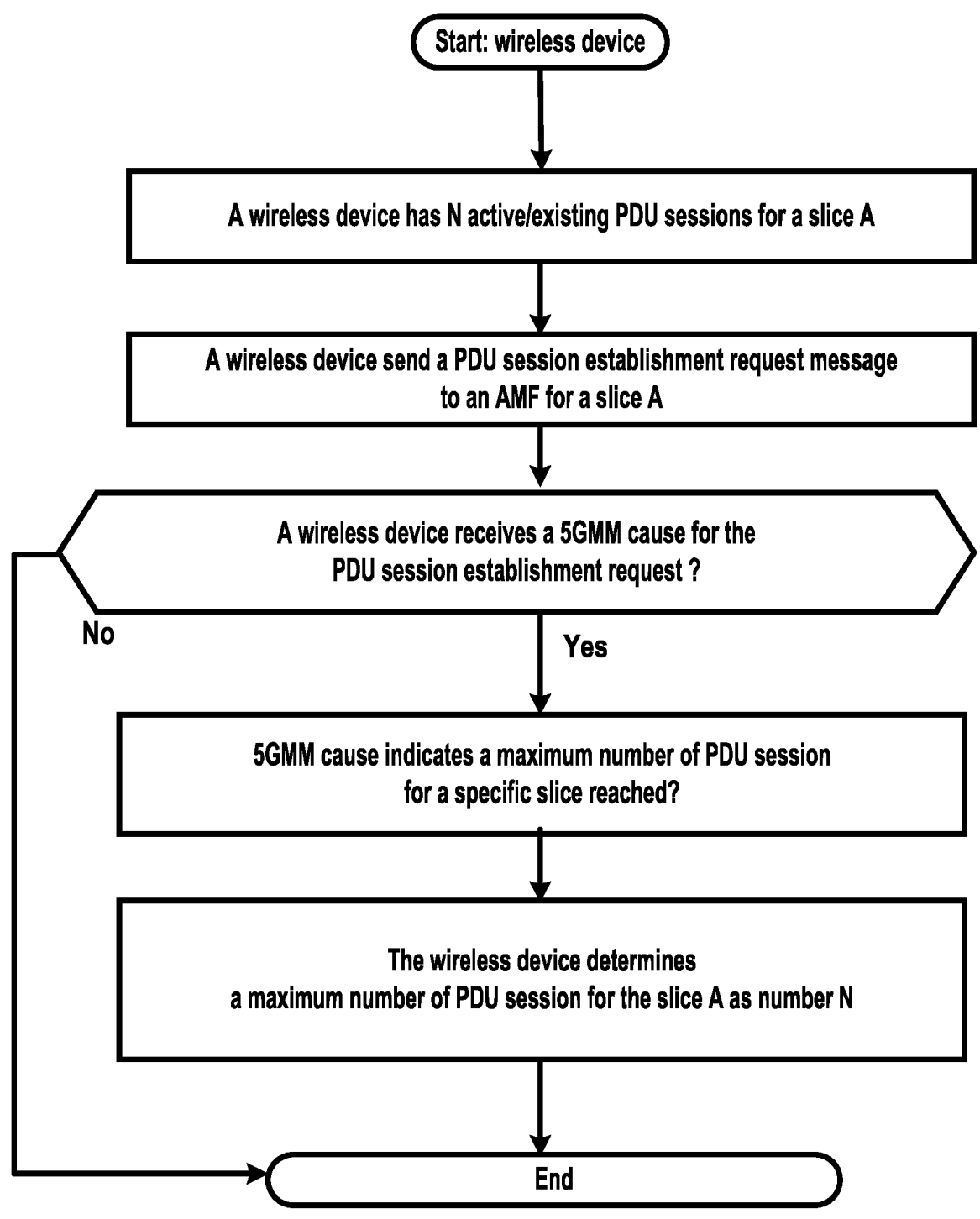
FIG. 28 is a flow chart of an aspect of an example embodiment of a present disclosure.

FIG. 28 shows a flow chart for a wireless device of an example embodiment. The wireless device may have N active/existing PDU sessions for a slice A. The wireless device may send a PDU session establishment request message to an AMF for a slice A. The wireless device may wait for a response message to the PDU session establishment request message. The wireless device may receive a 5GMM cause for the PDU session establishment request. The 5GMM cause may indicate that a maximum number of PDU session for a specific slice reached. The wireless device may determine that a maximum number of PDU session for the slice A is as number N.

Figure 29:
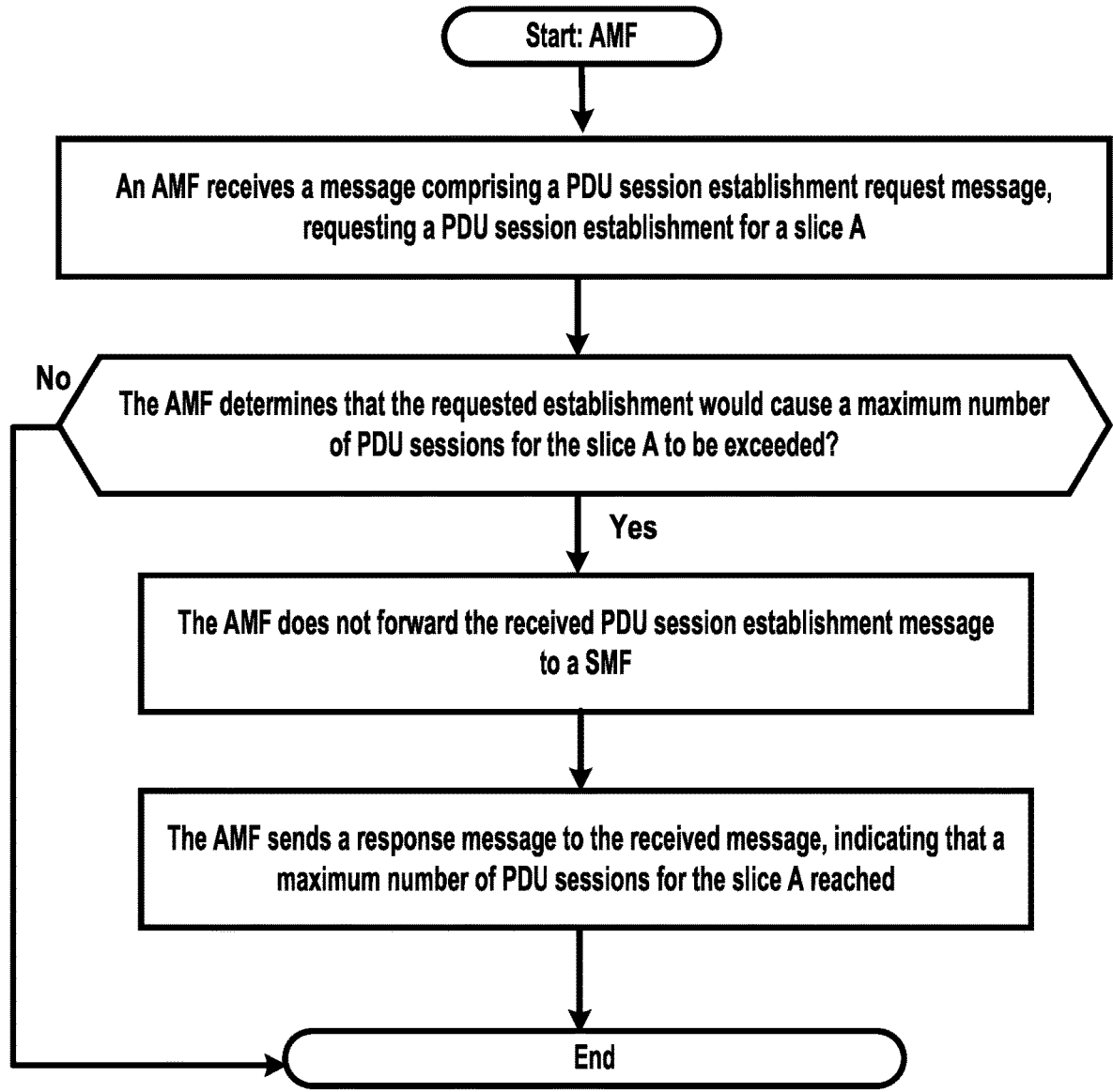
FIG. 29 is a flow chart of an aspect of an example embodiment of a present disclosure.

FIG. 29 shows a flow chart for an AMF of an example embodiment. The AMF may receive a message comprising a PDU session establishment request message, requesting a PDU session establishment for a slice A. The AMF may determine that the request establishment would cause a maximum number of PDU sessions for the slice A to be exceeded. The AMF may not forward the received PDU session establishment message to a SMF in response to the determining and send back the receive PDU session establishment request message to the wireless device. The AMF may send a response message in response to the message indicating that a max number of PDU sessions for the slice A reached. The response message may comprise the PDU session establishment request message, 5GMM cause indicating "maximum number of PDU sessions for a specific slice reached", and/or the like. The AMF may configure/mark that the AMF previously indicated/limited a maximum number of PDU session for the slice A (maximum number of PDU session for the slice A as existing PDU sessions for the slice A) of the wireless device in the wireless device context of the AMF.

In an example, a wireless device may send to an access and mobility management function (AMF), an uplink non-access stratum (NAS) transport message to request a packet data unit (PDU) session establishment for a slice. The wireless device may receive from the AMF, a downlink NAS transport message indicating a rejection of the request, wherein the downlink NAS transport message comprises a cause indicating that a maximum number of PDU sessions for the slice is reached. The wireless device may determine based on the cause, that a number of active PDU sessions for the slice is at the maximum number.

In an example, the wireless device may a second uplink NAS transport message to request a release of one of the active sessions for the slice, in response to the determining.

In an example, the wireless device may determine not to send a third uplink NAS transport message to request a session establishment for the slice.

In an example, the wireless may send a fourth update NAS transport message to request a session establishment for a second slice.

In an example, the wireless device may receive a UE configuration update message indicating a change of a maximum number of sessions for the slice, from the AMF.

In an example, the downlink NAS transport message may further comprise a time period associated to the cause value. The wireless device may start a timer based on the time period in response to receiving the downlink NAS transport message. The cause may be value during the time period. The wireless device may not request a new session request based on the cause during the time period.

In an example, the determining of the maximum number may be further based on that the maximum number is smaller than the wireless device's implementation-specific maximum number of PDU sessions.

In an example, the determining of the maximum number may be further based on that the maximum number is smaller than a maximum number of PDU session identities allowed by a protocol.

In an example, the uplink NAS transport may further comprise a payload container type, a payload container, a PDU session identity, a request type, single network slice selection assistance information (S-NSSAI), DNN, and/or the like.

In an example, the payload container type may comprise a N1 session management (SM) information, a short message service, long term evolution positioning protocol message container, a user equipment (UE) policy container, a UE parameters update transparent, and/or the like.

In an example, the payload container type may indicate a N1 session management information. The payload container may comprise a session management (SM) NAS message, wherein the SM message is a PDU session request message. The downlink NAS transport message further comprises the SM message.

In an example, the request type may comprise an initial request, an existing PDU session, an initial emergency request, existing emergency DPU session, modification request, and/or the like. The request type may indicate an initial request. The request type may indicate an existing PDU session.

In an example, the S-NSSAI may be an allowed S-NSSAI of the wireless device.

In an example, the cause value may further indicate that a maximum number of PDU sessions for the wireless device reached.

In an example, the wireless device may determine the maximum number of PDU session is a number of active PDU sessions of the wireless device based on the cause.

In an example, the cause may be a mobility management cause.

In an example, the number of active PDU sessions may be a number of active PDU sessions of the wireless device.

In an example, the cause may be a reject cause.

In an example, the wireless device to an access and mobility management function (AMF), a registration request message comprising one or more single network slice selection assistance information (S-NSSAI). The wireless device may receive a registration accept message from the AMF. The registration accept message comprises may comprise one or more allowed S-NSSAI(s), a maximum number of sessions for the associated allowed S-NSSAI(s). The wireless device may determine a maximum number of sessions for the one or more allowed S-NSSAI.

The wireless device may send a packet data unit (PDU) session establishment request message for the one or more allowed S-NSSAI(s) in response to an established number of PDU sessions for the S-NSSAI being smaller than the maximum number of sessions.

In an example, the wireless device may determine do not send, a packet data unit (PDU) session establishment request message in response to an established number of PDU sessions for the S-NSSAI being equal than the maximum number of sessions.

In an example, the wireless device may receive from an access and mobility management function (AMF), a configuration update message, wherein the configuration update message may comprise one or more allowed S-NSSAI(s), a maximum number of sessions for the one or more allowed S-NSSAI(s), and/or the like. The wireless device may send a acknowledge message in response to the receiving. The wireless device may determine a maximum number of session for the one or more allowed S-NSSAI.

In an example, a wireless device may send to an access and mobility management function (AMF), an uplink non-access stratum (NAS) transport message to request a packet data unit (PDU) session establishment for a slice. The wireless device may receive from the AMF, a downlink NAS transport message indicating a accept the request, wherein the downlink NAS transport message comprises a cause value indicating a maximum number of PDU sessions for the slice reached. The wireless device may determine the maximum number of PDU sessions for the slice of the wireless device is a number of active PDU sessions for the slice based on the cause. The active PDU sessions may include the requested/accepted PDU session for the slice. In an example the cause may be a session management cause.

In an example, an access and mobility management function (AMF) may receive from a wireless device, an uplink non-access stratum (NAS) transport message to request a packet data unit (PDU) session establishment for a slice. The AMF may determine that the requested establishment would cause a maximum number of PDU sessions for the slice to be exceeded. The AMF may send a downlink NAS transport message to reject the PDU session establishment. The downlink NAS t transport message may comprise a cause indicating that the maximum number of PDU sessions for the slice is reached.

In an example, the AMF may receive an indication that a PDU session quota of the slice is reached.

In an example, the determining is based on the indication.

In an example, the network function is a network data analytics function.

In an example, the AMF may receive from a network function, a maximum number of PDU sessions of the slice for the wireless device.

In an example, the determining may be based on the maximum number of PDU sessions for the slice is reached before receiving the uplink NAS transport message.

In an example, the AMF may receive from a network function, an indication that a PDU session quota of the slice is overloaded.

In an example, the AMF may send to a network function, an notifying request of a quota overloading for the slice.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

FIG. 30 illustrates an example in accordance with an embodiment of the present disclosure. At 3010, an access and mobility management function (AMF) receives from a wireless device, an uplink NAS message comprising a session management message, to request a PDU session establishment for a slice. At 3020, the AMF sends to the wireless device, based on a maximum number of sessions for the slice, a downlink NAS message indicating a rejection of the request, wherein the downlink NAS message comprises a cause parameter indicating that the maximum number of session for the slice is reached.

FIG. 31 illustrates an example in accordance with an embodiment of the present disclosure. At 3110, a wireless device sends to an access and mobility management function (AMF), an uplink NAS message comprising a session management message to request a PDU session establishment for a slice. At 3120, the wireless device receives, from the AMF, a downlink NAS message indicating a rejection of the request, the downlink NAS message comprises: a cause parameter indicating that a maximum number of PDU sessions for the slice is reached; and the session management message.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:

receiving, by an access and mobility management function from a wireless device, a message requesting establishment of a session for a slice;

determining, by the access and mobility management function, that a maximum number of sessions for the slice is reached;

sending, by the access and mobility management function to the wireless device, based on the determining that the maximum number of sessions for the slice is reached, a message rejecting the establishment of the session for the slice, the message comprising a time value for a timer and indicating that the wireless device is:

allowed to initiate a session release procedure for the slice while the timer is running;

prohibited from performing session modification for the slice while the timer is running; and prohibited from initiating a session establishment for the slice while the timer is running;

determining a change to the maximum number of sessions for the slice, the change based on a change in an attribute of the slice; and sending, by the access and mobility management function to the wireless device, based on the determining that the maximum number of sessions for the slice has changed, a configurate update message indicating the change to establish fairness among one or more wireless devices including the wireless device.

2. The method of claim 1, wherein the message requesting the establishment of the session is an uplink non-access stratum transport message.

3. The method of claim 1, wherein the message requesting the establishment of the session comprises a packet data unit session establishment request message.

4. The method of claim 1, wherein the message requesting the establishment of the session comprises a slice identifier of the slice.

5. The method of claim 1, wherein the message rejecting the request for the establishment of the session is a downlink non-access stratum transport message.

6. The method of claim 1, wherein the message rejecting the request for the establishment of the session comprises a cause parameter indicating that the maximum number of sessions for the slice has been reached.

7. The method of claim 6, wherein the cause parameter is a fifth generation mobility management, 5GMM, cause parameter.

8. The method of claim 1, further comprising receiving, by the access and mobility management function from another network function, an indication of the maximum number of packet data unit sessions of the slice for the wireless device.

9. The method of claim 8, wherein the indication is received from a network data analytics function.

10. The method of claim 8, wherein the indication is an indication of the maximum number of packet data unit sessions of the slice for the wireless device.

11. An access and mobility management function comprising one or more processors and memory storing instructions that, when executed by the one or more processors, cause the access and mobility management function to:

receive, from a wireless device, a message requesting establishment of a session for a slice;

determine that a maximum number of sessions for the slice is reached;

send, to the wireless device, based on the determining that the maximum number of sessions for the slice is reached, a message rejecting the establishment of the session for the slice, the message comprising a time value for a timer and indicating that the wireless device is:

allowed to initiate a session release procedure for the slice while the timer is running;

prohibited from performing session modification for the slice while the timer is running; and prohibited from initiating a session establishment for the slice while the timer is running;

determine a change to the maximum number of sessions for the slice, the change based on a change in an attribute of the slice; and send, to the wireless device, based on the determining that the maximum number of sessions for the slice has changed, a configurate update message indicating the change to establish fairness among one or more wireless devices including the wireless device.

12. The access and mobility management function of claim 11, wherein the message requesting the establishment of the session is an uplink non-access stratum transport message.

13. The access and mobility management function of claim 11, wherein the message requesting the establishment of the session comprises a packet data unit session establishment request message.

14. The access and mobility management function of claim 11, wherein the message requesting the establishment of the session comprises a slice identifier of the slice.

15. The access and mobility management function of claim 11, wherein the message rejecting the request for the establishment of the session is a downlink non-access stratum transport message.

16. The access and mobility management function of claim 11, wherein the message rejecting the request for the establishment of the session comprises a cause parameter indicating that the maximum number of sessions for the slice has been reached.

17. The access and mobility management function of claim 16, wherein the cause parameter is a fifth generation mobility management, 5GMM, cause parameter.

18. The access and mobility management function of claim 11, further comprising receiving, by the access and mobility management function from another network function, an indication of the maximum number of packet data unit sessions of the slice for the wireless device.

19. The access and mobility management function of claim 18, wherein the indication is received from a network data analytics function.

20. A non-transitory computer-readable medium encoded with instructions that, when executed by one or more processor of an access and mobility management function, perform:

receive, from a wireless device, a message requesting establishment of a session for a slice;

determine that a maximum number of sessions for the slice is reached;

send, to the wireless device, based on the determining that the maximum number of sessions for the slice is reached, a message rejecting the establishment of the session for the slice, the message comprising a time value for a timer and indicating that the wireless device is:

allowed to initiate a session release procedure for the slice while the timer is running;

prohibited from performing session modification for the slice while the timer is running; and prohibited from initiating a session establishment for the slice while the timer is running;

determine a change to the maximum number of sessions for the slice, the change based on a change in an attribute of the slice; and send, to the wireless device, based on the determining that the maximum number of sessions for the slice has changed, a configurate update message indicating the change to establish fairness among one or more wireless devices including the wireless device.

* * * * *